US012650231B2

(12) United States Patent
Lee

(10) Patent No.: US 12,650,231 B2
(45) Date of Patent: Jun. 9, 2026

(54) COOKING APPARATUS AND METHOD OF CONTROLLING THE SAME

(71) Applicant: Samsung Electronics Co., Ltd., Suwon-si (KR)

(72) Inventor: Jaeseok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 18/338,687

(22) Filed: Jun. 21, 2023

(65) Prior Publication Data

US 2023/0341128 A1 Oct. 26, 2023

Related U.S. Application Data

(63) Continuation of application No. PCT/KR2021/017944, filed on Dec. 1, 2021.

(30) Foreign Application Priority Data

Jan. 4, 2021 (KR) ........................ 10-2021-0000418

(51) Int. Cl.
*F24C 3/12* (2006.01)
*H04L 5/00* (2006.01)
(52) U.S. Cl.
CPC ............ *F24C 3/126* (2013.01); *H04L 5/0053* (2013.01)
(58) Field of Classification Search
CPC ........ H04L 5/0053; H04L 67/125; F17D 3/01
USPC ........................................................ 126/1 R
See application file for complete search history.

(56) References Cited

U.S. PATENT DOCUMENTS

| | | | |
|---|---|---|---|
| 9,367,058 B2 | 6/2016 | Kang et al. | |
| 9,860,362 B2 | 1/2018 | Kuemmerle et al. | |
| 10,082,297 B2 | 9/2018 | Kim et al. | |
| 10,092,129 B2 * | 10/2018 | Jenkins | F24C 7/08 |
| 10,136,376 B2 * | 11/2018 | Yoon | H04L 43/0811 |
| 10,438,508 B2 | 10/2019 | Shinomoto et al. | |
| 10,444,723 B2 | 10/2019 | Young et al. | |
| 11,644,198 B2 * | 5/2023 | Lee | F24C 3/126 |
| | | | 99/342 |

(Continued)

FOREIGN PATENT DOCUMENTS

| | | | | |
|---|---|---|---|---|
| AU | 2009208012 A1 * | 7/2009 | | H04W 4/12 |
| EP | 2992708 A2 | 3/2016 | | |

(Continued)

OTHER PUBLICATIONS

International Search Report dated Mar. 17, 2022, issued in International Patent Application No. PCT/KR2021/017944.

(Continued)

*Primary Examiner* — Allen R. B. Schult
*Assistant Examiner* — William C Weinert
(74) *Attorney, Agent, or Firm* — Jefferson IP Law, LLP

(57) ABSTRACT

A cooking apparatus is provided. The cooking apparatus includes a cooking module configured to perform a cooking operation by heating an object to be heated, a communication module configured to communicate with a user terminal, and at least one processor configured to control the cooking module to perform the cooking operation based on a control command received from the user terminal, and control the cooking module to stop the cooking operation in response to disconnection of communication with the user terminal.

16 Claims, 24 Drawing Sheets

(56)          References Cited

U.S. PATENT DOCUMENTS

| | | | |
|---|---|---|---|
| 2018/0242772 A1 | 8/2018 | Jenkins et al. | |
| 2019/0162418 A1 | 5/2019 | Egenter et al. | |
| 2019/0394513 A1* | 12/2019 | Shin ................. | H04N 21/44004 |

FOREIGN PATENT DOCUMENTS

| | | | |
|---|---|---|---|
| JP | 2004-219007 | A | 8/2004 |
| JP | 2012-129690 | A | 7/2012 |
| JP | 2018-175671 | A | 11/2018 |
| JP | 6646857 | B2 | 2/2020 |
| JP | 2020-106253 | A | 7/2020 |
| JP | 2020-165588 | A | 10/2020 |
| KR | 10-2014-0107976 | A | 9/2014 |
| KR | 10-2015-0118430 | A | 10/2015 |
| KR | 10-2016-0048432 | A | 5/2016 |
| KR | 10-2017-0078301 | A | 7/2017 |
| KR | 10-2017-0109213 | A | 9/2017 |
| KR | 10-2017-0121078 | A | 11/2017 |
| KR | 10-1803734 | B1 | 12/2017 |
| KR | 10-2019-0057202 | A | 5/2019 |
| KR | 10-2019-0095198 | A | 8/2019 |
| KR | 10-2020-0099227 | A | 8/2020 |
| KR | 10-2248151 | B1 | 5/2021 |
| WO | 2012-144776 | A2 | 10/2012 |
| WO | 2014-135887 | A2 | 9/2014 |

OTHER PUBLICATIONS

Korean Office Action dated Aug. 1, 2025, issued in Korean Application No. 10-2021-0000418.

* cited by examiner

FIG. 11

| TYPE OF COOKING MODULE | CONTROL DESCRIPTION WHEN COOKING OPERATION IS STOPPED |
|---|---|
| ELECTRICITY | SEND OFF SIGNAL |
| GAS | CONTROL VALVE TO CLOSE GAS SUPPLY TUBE |

COOKING APPARATUS AND METHOD OF CONTROLLING THE SAME

CROSS-REFERENCE TO RELATED APPLICATION(S)

This application is a continuation application, claiming priority under § 365(c), of an International application No. PCT/KR2021/017944, filed on Dec. 1, 2021, which is based on and claims the benefit of a Korean patent application number 10-2021-0000418, filed on Jan. 4, 2021, in the Korean Intellectual Property Office, the disclosure of which is incorporated by reference herein in its entirety.

BACKGROUND

1. Field

The disclosure relates to a cooking apparatus controllable through a user terminal.

2. Description of Related Art

A cooking apparatus is a device that cooks food by heating, and is largely classified into a type that generates heat with electricity and a type that generates heat by burning a gas.

Technologies to remotely control the cooking apparatus are being developed these days to enhance performance of cooking food. For example, the user may control the cooking apparatus through a user terminal by using a home network system even when the user is not present in the same space.

However, when the communication between the user terminal and the cooking apparatus is disconnected during the remote control, the user is unable to control the cooking apparatus, which may lead to a problem, such as fire, explosion, gas leakage, overheating or burn.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a cooking apparatus capable of securing stability by stopping a cooking operation when communication with a user terminal is disconnected during remote control, and guaranteeing cooking continuity by resuming the cooking operation based on cooking status information at the time of stopping the cooking operation when connection of the communication with the user terminal is restored.

Additional aspects will be set forth in part in the description which follows and, in part, will be apparent from the description, or may be learned by practice of the presented embodiments.

In accordance with an aspect of the disclosure, a cooking apparatus is provided. The cooking apparatus includes a cooking module configured to perform a cooking operation by heating an object to be cooked, a communication module configured to communicate with a user terminal, and at least one processor configured to control the cooking module to perform the cooking operation based on a control command received from the user terminal and control the cooking module to stop the cooking operation in response to disconnection of communication with the user terminal.

The at least one processor controls the communication module to transmit cooking status information to the user terminal, and determine the communication with the user terminal as being disconnected based on a failure of receiving acknowledgment (ACK) from the user terminal.

The at least one processor controls the communication module to retransmit the cooking status information a preset number of times in response to the failure of receiving the ACK from the user terminal.

The at least one processor determines the communication with the user terminal as being disconnected based on a failure of receiving the ACK after the retransmission of the cooking status information.

The at least one processor determines the communication with the user terminal as being disconnected based on a failure of receiving a communication signal for a preset period of time from an access point (AP) which relays communication with the user terminal.

The at least one processor determines the communication with the user terminal as being disconnected based on reception of information about disconnection of the communication with the user terminal from an external server.

The at least one processor sends an off signal to the cooking module to stop the cooking operation in response to disconnection of the communication with the user terminal.

The cooking apparatus further includes a valve configured to open or close a gas supply tube connected to the cooking module, and the controller may control the valve to close the gas supply tube to stop the cooking operation in response to disconnection of the communication with the user terminal.

The at least one processor controls the cooking module to stop the cooking operation after elapse of a preset period of time depending on a cooking progress stage in response to disconnection of the communication with the user terminal.

The at least one processor determines an ongoing time section of a plurality of time sections of a whole cooking time in response to disconnection of the communication with the user terminal, and control the cooking module to stop the cooking operation after elapse of the preset period of time corresponding to the determined time section.

The at least one processor controls the communication module to try communication with the user terminal a preset number of times before controlling the cooking module to stop the cooking operation after elapse of a preset period of time.

The at least one processor determines cooking status information at a time when the communication with the user terminal is disconnected, and control the cooking module to resume the cooking operation based on the cooking status information in response to restoration of connection of the communication with the user terminal.

The at least one processor controls the communication module to transmit, to the user terminal, a message confirming whether to resume the cooking operation in response to restoration of connection of the communication with the user terminal, and control the cooking module to resume the cooking operation in response to reception of a command to resume the cooking operation from the user terminal.

The at least one processor determines a rest of a set cooking time based on the cooking status information in response to restoration of the communication with the user terminal, and control the cooking module to perform the cooking operation for the determined rest of the cooking time.

In accordance with another aspect of the disclosure, a method of controlling a cooking apparatus including a cooking module for performing a cooking operation by heating an object to be cooked and a communication module for communicating with a user terminal is provided. The method includes controlling the cooking module to perform the cooking operation based on a control command received from the user terminal, and controlling the cooking module to stop the cooking operation in response to disconnection of communication with the user terminal.

According to embodiments of the disclosure, a cooking apparatus secures stability by stopping a cooking operation when communication with a user terminal is disconnected during remote control, and guarantee cooking continuity by resuming the cooking operation based on cooking status information at the time of stopping the cooking operation when connection of the communication with the user terminal is restored.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 illustrates control descriptions of an occasion when a cooking apparatus stops a cooking operation, according to an embodiment of the disclosure;

The same reference numerals are used to represent the same elements throughout the drawings.

DETAILED DESCRIPTION

Figure 1:
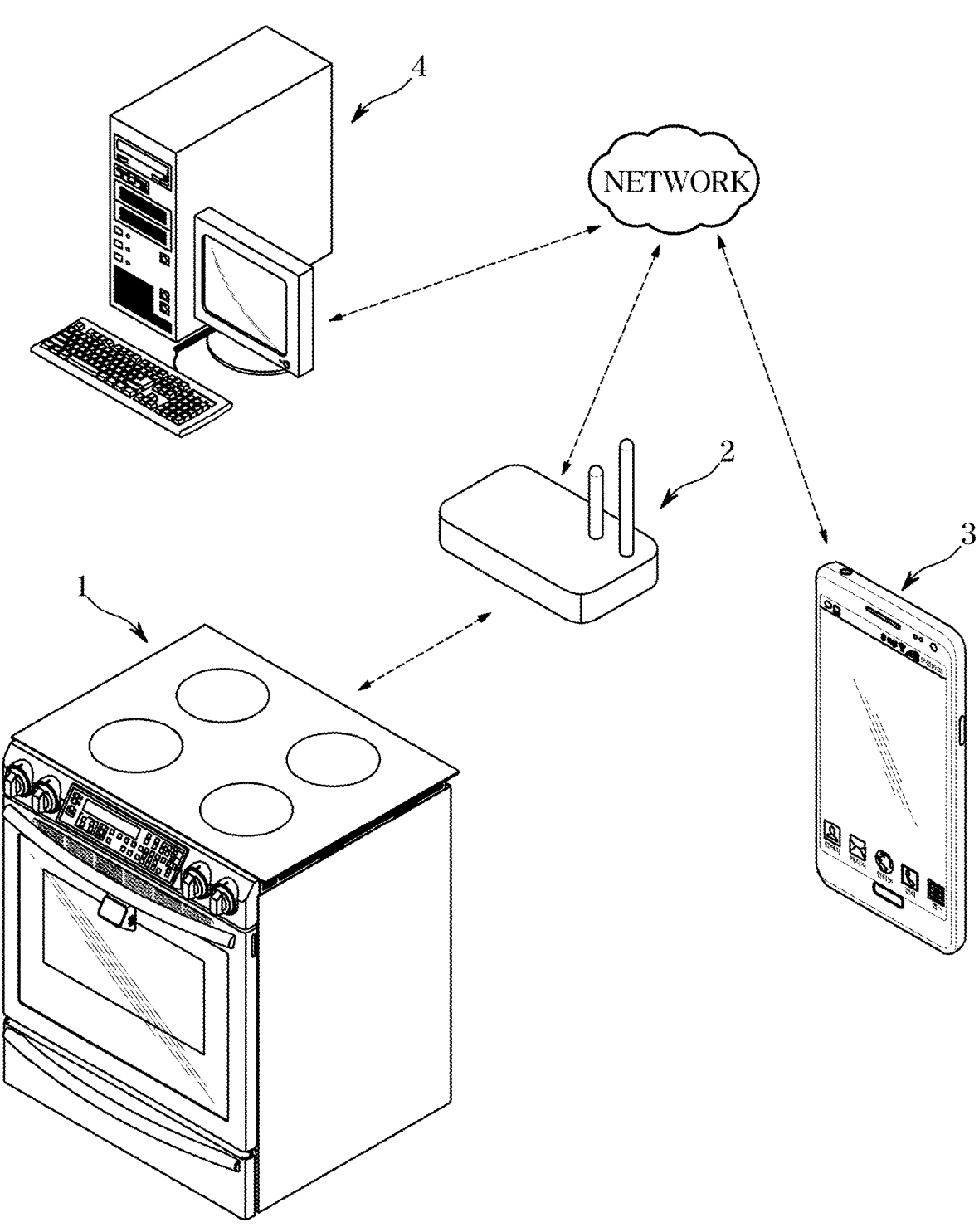
FIG. 1 illustrates a home network system including a cooking apparatus, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be further understood that the term "connect" or its derivatives refer both to direct and indirect connection, and the indirect connection includes a connection over a wireless communication network.

The terminology used herein is for the purpose of describing particular embodiments only and is not intended to limit the disclosure. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure.

Furthermore, the terms, such as "~ part", "~ block", "~ member", "~ module", or the like, may refer to a unit of handling at least one function or operation. For example, the terms may refer to at least one process handled by hardware, such as field-programmable gate array (FPGA)/application specific integrated circuit (ASIC), or the like, software stored in a memory, or at least one processor.

Reference numerals used for method steps are just used to identify the respective steps, but not to limit an order of the steps. Thus, unless the context clearly dictates otherwise, the written order may also be practiced otherwise.

Reference will now be made in detail to embodiments of the disclosure, which are illustrated in the accompanying drawings.

FIG. 1 illustrates a home network system including a cooking apparatus according to an embodiment of the disclosure.

Referring to FIG. 1, the home network system includes a cooking apparatus 1, an access point (AP) 2, a user terminal 3, and a server 4.

In an embodiment of the disclosure, the cooking apparatus 1 is a home appliance for cooking food by heating the food, and may operate in response to receiving a control command from the user equipment 3. Specifically, the cooking apparatus 1 may receive a control command input to the user terminal 3, and perform a cooking operation based on the received control command.

In an embodiment of the disclosure, the cooking apparatus 1 may stop the cooking operation performed based on the control command received from the user terminal 3 when communication with the user terminal 3 is disconnected.

When the user is unable to remotely control the cooking apparatus 1 because the communication with the user terminal 3 is disconnected, the cooking apparatus 1 that is performing a heating operation may cause, by nature, a problem, such as fire, explosion, gas leakage, product overheating, or burn.

Hence, the cooking apparatus 1 according to an embodiment may stop the cooking operation when the communication with the user terminal 3 is disconnected, thereby preventing safety problems. Stopping the cooking operation in response to disconnection of communication with the user terminal 3 will be described later in detail.

Furthermore, in an embodiment of the disclosure, the cooking apparatus 1 may resume the cooking operation based on cooking status information stored when the cooking operation is stopped, when connection of the communication with the user terminal 3 is restored after the cooking operation is stopped due to the disconnection of communication with the user terminal 3, thereby guaranteeing cooking continuity. Resumption of the cooking operation will be described later in more detail.

In an embodiment of the disclosure, the AP 2 is a network device that supports a home appliance to be able to access a network. In other words, the AP 2 may be connected to the network, and the home appliance may access the network by being wirelessly connected to the AP 2. The AP 2 may correspond to e.g., a wireless fidelity (Wi-Fi) router.

Specifically, the AP 2 may receive data from the user terminal 3 or the server 4 over the network, and send the received data to the cooking apparatus 1. Furthermore, the AP 2 may receive data from the cooking apparatus 1, and transmit the received data to the user terminal 3 or the server 4 over the network. In other words, the cooking apparatus 1 may access the network through the AP 2, and transmit or receive information to or from the user terminal 3 or the server 4 over the network.

In this case, the AP 2 may constantly transmit a communication signal so that the cooking apparatus 1 at home may be wirelessly connected to the AP 2, and a communication module of the cooking apparatus 1 may wirelessly transmit or receive information to or from the AP 2 by receiving the communication signal transmitted from the AP 2.

In an embodiment of the disclosure, the user terminal 3 may communicate with the cooking apparatus 1 and the server 4 over the network. The user terminal 3 may correspond to a wireless communication device of a type known to the public, e.g., a smartphone.

In an embodiment of the disclosure, the user terminal 3 may receive a control command for the cooking apparatus 1 from the user, and transmit the input control command to the cooking apparatus 1 through the server 4 and the AP 2.

In an embodiment of the disclosure, the server 4 is a device for storing, integrating, or distributing various types of information of the home appliances, and stores and redistributes a control command for each home appliance received over the network.

For example, the server 4 may store user information, information of the cooking apparatus 1 for each user, or information of at least one user terminal 3 authorized by the user.

In this case, the server 4 may access the AP 2 at home over the network.

The server 4 confirms identification information of the user terminal 3 that has transmitted a control command, upon reception of the control command from the user terminal 3, identifies the cooking apparatus 1 corresponding to the confirmed identification information of the user terminal 3, and transmits the control command of the user terminal 3 to the identified cooking apparatus 1.

The server 4 confirms information of the cooking apparatus 1 that has transmitted cooking status information, upon reception of the cooking status information from the cooking apparatus 1, identifies the user terminal 3 corresponding to the confirmed information of the cooking apparatus 1, and transmits the cooking status information to the identified user terminal 3.

In other words, the server 4 transmits the control command input from the user terminal 3 to the cooking apparatus 1 through the AP 2, and transmits the cooking status information of the cooking apparatus 1 input through the AP 2 to the user terminal 3.

When the communication with the user terminal 3 is disconnected, the server 4 may transmit information about disconnection of the communication with the user terminal 3 indicating disconnection of the communication with the user terminal 3 to the cooking apparatus 1.

An example of a case that the cooking apparatus 1 and the user terminal 3 communicate through the server 4 and the AP 2 was described above. It is not, however, limited thereto, and the cooking apparatus 1 and the user terminal 3 may communicate only through the AP 2 without the intervention of the server 4.

A configuration of the cooking apparatus 1 equipped in the home network system will be described in detail with reference to FIGS. 2 to 4.

Figure 2:
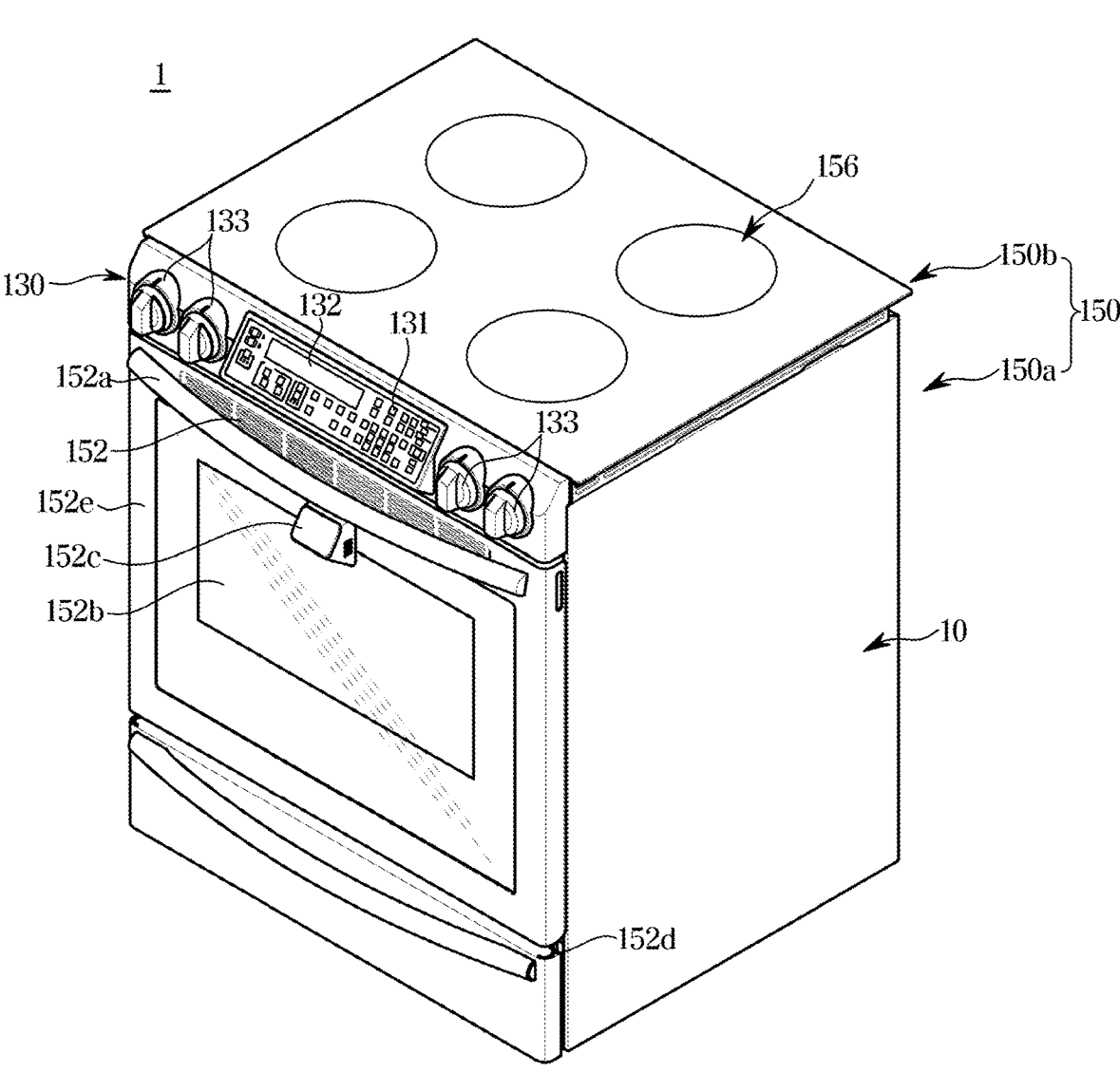
FIG. 2 illustrates a cooking apparatus, according to an embodiment of the disclosure.

FIG. 2 illustrates a cooking apparatus according to an embodiment of the disclosure.

Figure 3:
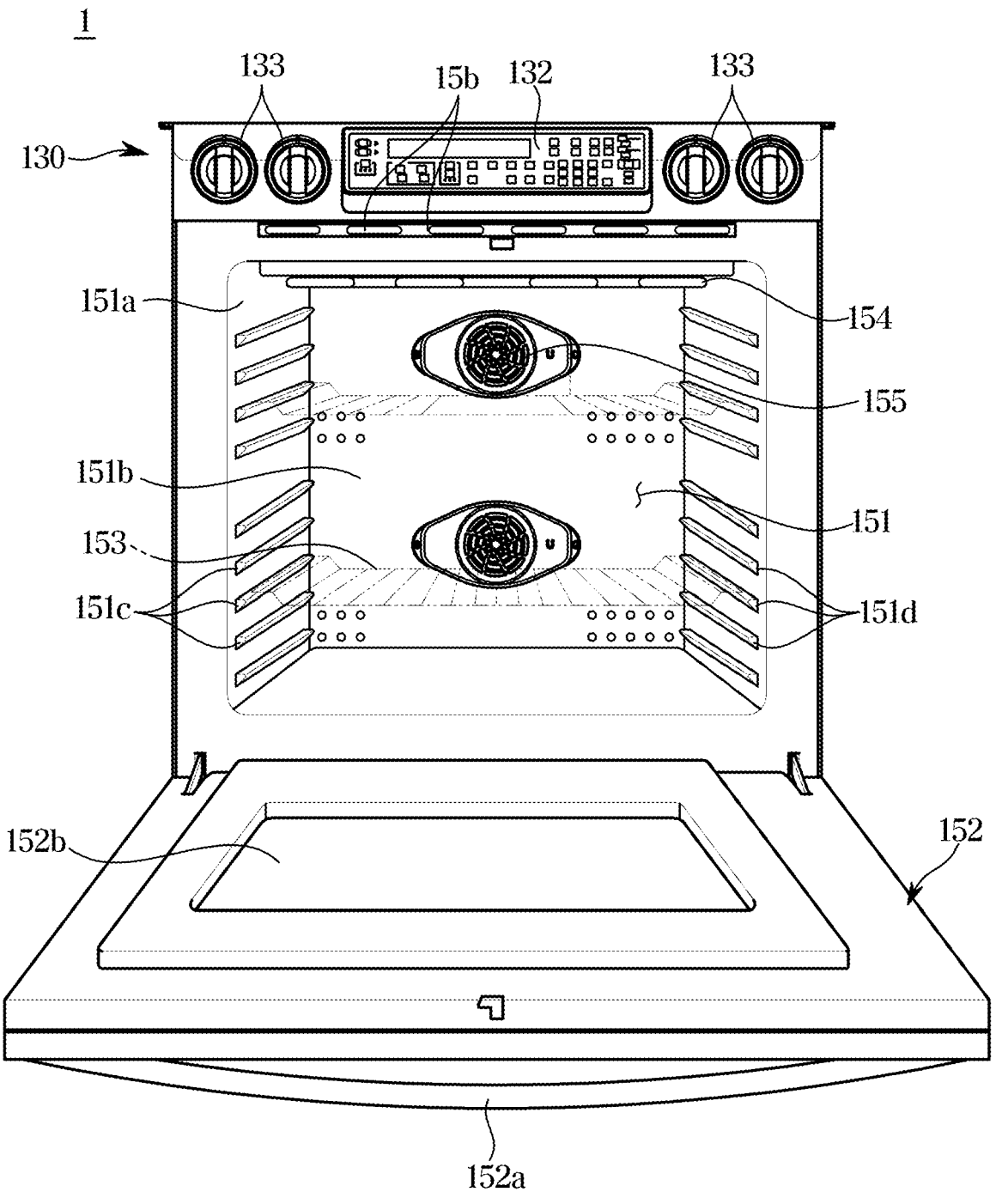
FIG. 3 illustrates a cooking chamber of a cooking apparatus shown in FIG. 2 according to an embodiment of the disclosure.

FIG. 3 illustrates a cooking chamber of a cooking apparatus shown in FIG. 2 according to an embodiment of the disclosure.

Figure 4:
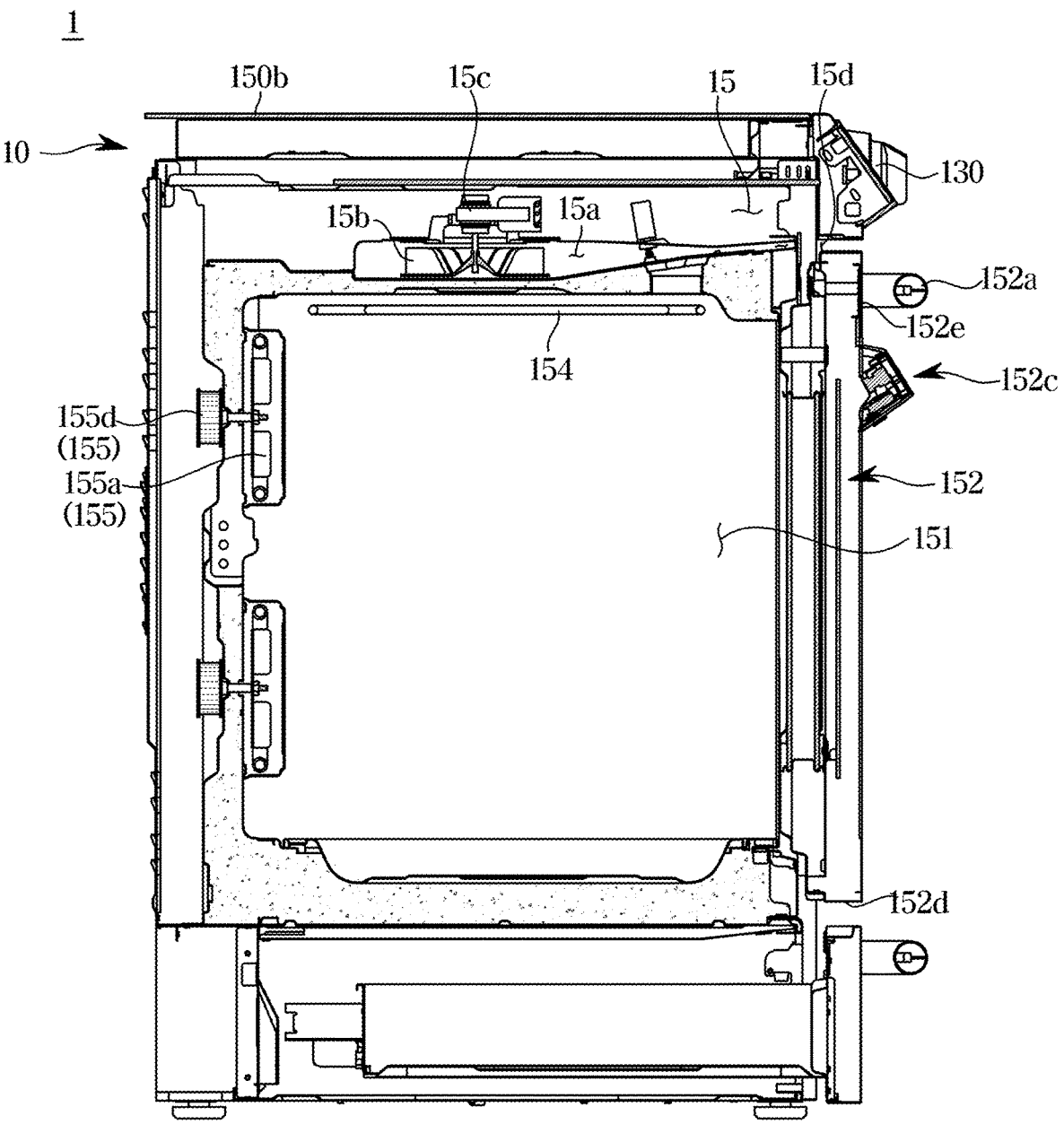
FIG. 4 is a side view of a cooking apparatus shown in FIG. 2 according to an embodiment of the disclosure.

FIG. 4 is a side view of a cooking apparatus shown in FIG. 2 according to an embodiment of the disclosure.

Referring to FIG. 2, the cooking apparatus 1 includes a cooking module 150 arranged in a main body 10 for performing a cooking operation by heating an object to be cooked. The cooking apparatus 1 may include the cooking module 150, and the cooking module 150 may correspond to a cooking device of a type known to the public, such as an oven, a cooking stove, a cooktop, an induction, an air fryer, or a hood.

For example, the cooking module 150 includes a first cooking module 150a and a second cooking module 150b located on top of the first cooking module 150a, as shown in FIG. 2. The first cooking module 150a may be an oven, and the second cooking module 150b may be a cooking stove.

The cooking module 150 including the first cooking module 150a and the second cooking module 150b will now be described for convenience of explanation. In some embodiments of the disclosure, the main body 10 of the cooking apparatus 1 may be equipped with only one of the first cooking module 150a and the second cooking module 150b.

The first cooking module 150a includes a cooking chamber 151 (see FIGS. 3 and 4) that forms a cooking space, and a door 152 for opening or closing the cooking chamber 151.

When a food is placed in the cooking chamber 151 and then closed by the door 152, the first cooking module 150a produces and transfers heat into the cooking chamber 151 so that the closed food is cooked with dry heat.

Specifically, as shown in FIG. 3, the cooking chamber 151 may be formed in the shape of a box, including an opening formed on the front for the food to be put in or taken out, side panels 151a formed with upper, lower, left and right sides, and a rear panel 151b arranged on edges of the side panels 151a.

The cooking chamber 151 further includes a pair of supporters 151c and 151d fixedly formed on the side panels 151a on the left and right to protrude from the side panel 151a. The pair of supporters 151c and 151d may be arranged in the plural from top to bottom in the cooking chamber 151.

A tray 153 may be detachably mounted on the pair of supporters 151c and 151d to place the food thereon. The tray 153 may be formed of an insulation material, insulating the cooking chamber 151 by dividing the cooking chamber 151 into two spaces and placing the food thereon. For example, the cooking chamber 151 may be divided by the tray 153 mounted on the pair of supporters 151c and 151d into multiple cooking spaces.

The door 152 of the first cooking module 150a may be rotationally coupled to the main body 10 on hinges. As shown in FIG. 2, the first cooking module 150a includes a handle 152a arranged on the door 152 to be gripped by the user, a viewing window 152b allowing the interior to be visually checked from outside the cooking chamber 151 while the door 152 is in the closed state, and a monitoring module 152c arranged on the viewing window 152b to monitor cooking status in the cooking chamber 151 through the viewing window 152b.

The handle 152a may be formed to protrude forward from the door. It is also possible to form the handle 152a to be sunken inward from the outer surface of the door 152 to make it easy for the user to grip the handle 152a.

Furthermore, the viewing window 152b may be formed of a transparent material, and although the monitoring module 152c is described as being arranged on the viewing window 152b of the door 152 on the outer side of the cooking chamber 151 as an example, it may be arranged in the cooking chamber 151.

As shown in FIGS. 2 and 4, the door 152 may include a door suction port 152d located at an outer bottom end to suck in air to the inside of the door 152, and a door discharge port 152e located at an outer top end to discharge the air brought in through the door suction port 152d to the outside. Hot air produced in the cooking chamber 151 may be cooled by circulation of the air brought in through the door suction port 152d. Furthermore, the air brought in through the door suction port 152d may exchange heat with the hot air of the cooking chamber 151 inside the door 152.

As shown in FIG. 4, the main body 10 of the cooking apparatus 1 further includes an electric room 15 arranged adjacent to the cooking chamber 151, having a separate space from the cooking chamber 151, and containing various types of electric parts (not shown), such as a circuit board.

In the electric room 15, an exhaust duct 15a, a cooling fan 15b for sucking in air of the cooking chamber 151 and forcing the air of the cooking chamber 151 and the air of the electric room 15 to be discharged in the forward direction of the main body 10, and a cooling motor 15c for driving the cooling fan 15b may be arranged.

The exhaust duct 15a of the electric room 15 connects the cooking chamber 151 to a discharge port 15d for the air of the cooking chamber 151 sucked into the electric room 15 to be discharged to the outside through the discharge port 15d formed on the front of the main body 10.

The first cooking module 150a further includes a heating module 154 arranged adjacent to the upper side of the cooking chamber 151 to produce and provide heat into the cooking chamber 151, and a circulating module 155 for circulating the air in the cooking chamber 151. The heating module 154 may be a heater. The heating module 154 may include a plurality of heaters.

Furthermore, the first cooking module 150a may further include a magnetron (not shown) for producing heat by generating electromagnetic waves to spin water molecules inside the food, and a steam module (not shown) for generating steam.

The circulating module 155 circulates the air in the cooking chamber in cooking the food. The circulating module 155 includes a circulation fan 155a arranged on the rear surface of the cooking chamber 151 to convect the air, and a circulation motor 155b for driving the circulation fan 155a. The circulation fan 155a may be provided in the plural, and the plurality of circulation fans 155a may be arranged from top to bottom in the cooking chamber. The circulation module 155a may selectively rotate at least one of the plurality of circulation fans 155a depending on a position of the food. The plurality of circulation fans 155a may be centrifugal fans or turbo fans that suck in air from the top and discharge the air in the radial direction. Furthermore, the cooking apparatus 1 may also control a flow rate of the air circulating in the cooking chamber 151 by controlling rotation force of the circulation motor 155b.

The second cooking module 150b includes at least one heating plate 156 arranged to be exposed to the outside of the main body 10 and allowing a cooking container to be placed thereon. The second cooking module 150b may transfer the generated heat to the cooking container placed on the at least one heating plate 156 so that the food in the cooking container is cooked. The at least one heating plate 156 may be a heating device that uses electricity or gas to produce heat.

The main body 10 of the cooking apparatus 1 includes a user interface 130 that receives control commands for the first cooking module 150a and the second cooking module 150b and outputs cooking status information. The user interface 130 may include a first input for receiving a control command for the first cooking module 150a and a first display 132 for outputting cooking status information of the first cooking module 150a.

The cooking status information may include information about a cooking mode, a temperature set for cooking, a time set for cooking, a cooking start time, a cooking progress time, a remaining cooking time, a cooking stop time, a cooking module temperature, or the like.

A first input 131 of the user interface 130 may be provided in a type of a physical button or a touch panel, and the first display 132 may be provided as a display panel installed separately from the first input 131. Alternatively, the first input 131 and the first display 132 of the user interface 130 may be provided as a touch screen. Specifically, the first input 131 may be provided as a touch panel, and the first display 132 may be provided as a flat display panel, such as a liquid crystal display (LCD), a plasma display panel (PDP), or an organic light emitting diode (LED) arranged adjacent to the touch panel for displaying a plurality of buttons and the cooking status information.

The user interface 130 may further include an operation module 133 arranged to correspond to the at least one heating plate 156 to receive heating level information and an on/off operation command for the at least one heating plate 156. The operation module 133 may be provided in a type of a physical button, a touch pad or a dial. There may be as many operation modules 133 as the number of heating plates. It is also possible that the first display 132 of the user interface displays a heating level and an on or off operation state during operation of the second cooking module 150b.

An example of a mechanical structure of the cooking apparatus 1 was described above. The mechanical structure of the cooking apparatus 1 is not, however, limited to the example, and as described above, the cooking apparatus 1 may include at least one cooking module 150, which may correspond to a cooking device of a type known to the public. An embodiment in which the cooking apparatus 1 stops a cooking operation in response to disconnection of communication with the user terminal 3 and resumes the cooking operation when the connection of communication with the user terminal 3 is restored will now be described in detail.

Figure 5:
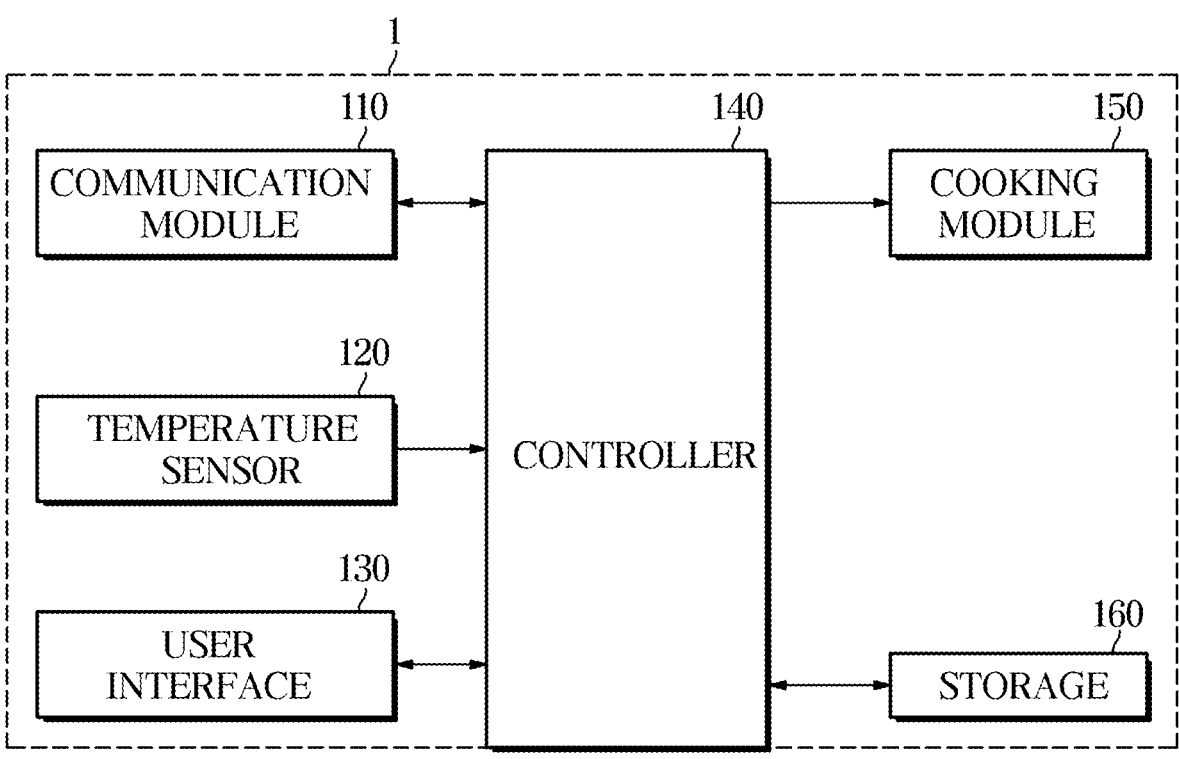
FIG. 5 is a control block diagram of a cooking apparatus according to an embodiment of the disclosure.

FIG. 5 is a control block diagram of a cooking apparatus according to an embodiment of the disclosure.

Referring to FIG. 5, the cooking apparatus 1 according to the embodiment includes a communication module 110 for performing communication with an external electronic device, a temperature sensor 120 for measuring temperature of the cooking module 150, the user interface 130 for receiving a control command from the user and displaying various status information, a controller 140 for controlling a cooking operation based on a connection state of communication with the user terminal 3, the cooking module 150 for performing the cooking operation by heating the food, and a storage 160 for storing the cooking status information and various control information.

Some of the components of the cooking apparatus 1 shown in FIG. 5 may be omitted in some embodiments of the disclosure, and the cooking apparatus 1 may include other components in addition to the components shown in FIG. 5.

In an embodiment of the disclosure, the communication module 110 may communicate with the user terminal 3 and the server 4 through the AP 2. For this, the communication module 110 may be provided as a known-type of communication module.

In an embodiment of the disclosure, the temperature sensor 120 may measure temperature of the cooking module 150, and may be provided as a known type of temperature sensor.

In an embodiment of the disclosure, the user interface 130 may receive a control command from the user, and display cooking status information corresponding to a cooking operation. For this, the user interface 130 may include an input device and a display of a type known to the public.

Furthermore, in an embodiment of the disclosure, the user interface 130 may display whether the communication module 110 receives a communication signal. Specifically, the user interface 130 may indicate connection with the AP 2 when the communication module 110 receives a communication signal (e.g., a Wi-Fi signal) from the AP 2, and indicate disconnection from the AP 2 when the communication module 110 fails to receive a communication signal from the AP 2. For example, the user interface 130 may display a communication connected icon when the communication module 110 receives a communication signal from the AP 2, and stop displaying the communication connected icon when the communication module 110 fails to receive a communication signal from the AP 2.

In an embodiment of the disclosure, the controller 140 may control the cooking module 150 to perform a cooking operation based on a control command received from the user terminal 3. Specifically, when the communication module 110 receives a control command from the user terminal 3 through the AP 2, the controller 140 may control the cooking module 150 to perform a cooking operation based on the control command.

In an embodiment of the disclosure, when the communication with the user terminal 3 is disconnected while the controller 140 controls the cooking module 150 to perform the cooking operation based on the received control command, the controller 140 may control the cooking module 150 to stop the cooking operation.

When the user is unable to remotely control the cooking apparatus 1 because the communication with the user terminal 3 is disconnected, the cooking apparatus 1 that is performing a heating operation may cause, by nature, a problem, such as fire, explosion, gas leakage, product overheating, or burn.

Hence, the cooking apparatus 1 according to an embodiment may stop the cooking operation when the communication with the user terminal 3 is disconnected, thereby preventing safety problems. Stopping the cooking operation in response to disconnection of communication with the user terminal 3 will be described later in detail.

Furthermore, in an embodiment of the disclosure, the controller 140 may resume the cooking operation based on the cooking status information stored when the cooking operation is stopped, when connection of the communication with the user terminal 3 is restored after the cooking operation is stopped due to the disconnection of communication with the user terminal 3, thereby guaranteeing cooking continuity. Resumption of the cooking operation will be described later in more detail.

The controller 500 may include at least one memory for storing a program and various types of data to perform the aforementioned operation and an operation as will be described later, and at least one processor for executing the stored program.

According to an embodiment of the disclosure, the cooking module 150 may perform a cooking operation by heating an object to be cooked. For example, the cooking module 150 may include the first cooking module 150a and the second cooking module 150b as described above in connection with FIGS. 2 and 4. It is not, however, limited thereto, and the cooking apparatus 1 may include at least one cooking module 150, and the cooking module 150 may correspond to a cooking device of a type known to the public, such as an oven, a cooking stove, a cooktop, an induction, an air fryer, or a hood.

In an embodiment of the disclosure, the storage 160 may store the cooking status information determined by the controller 140 during a cooking operation. Especially, the storage 160 may store the cooking status information of the time when the communication with the user terminal 3 is disconnected. The cooking status information stored at the time of disconnection of communication may be a basis for resumption of the cooking operation when connection of the communication with the user terminal 3 is restored. In this case, the storage 160 may be implemented as a known type of storage medium that stores various information, such as the cooking status information.

The control configuration of the cooking apparatus 1 was described above in detail. An embodiment of stopping the cooking operation when the communication with the user terminal 3 is disconnected will now be described in detail.

Figure 6:
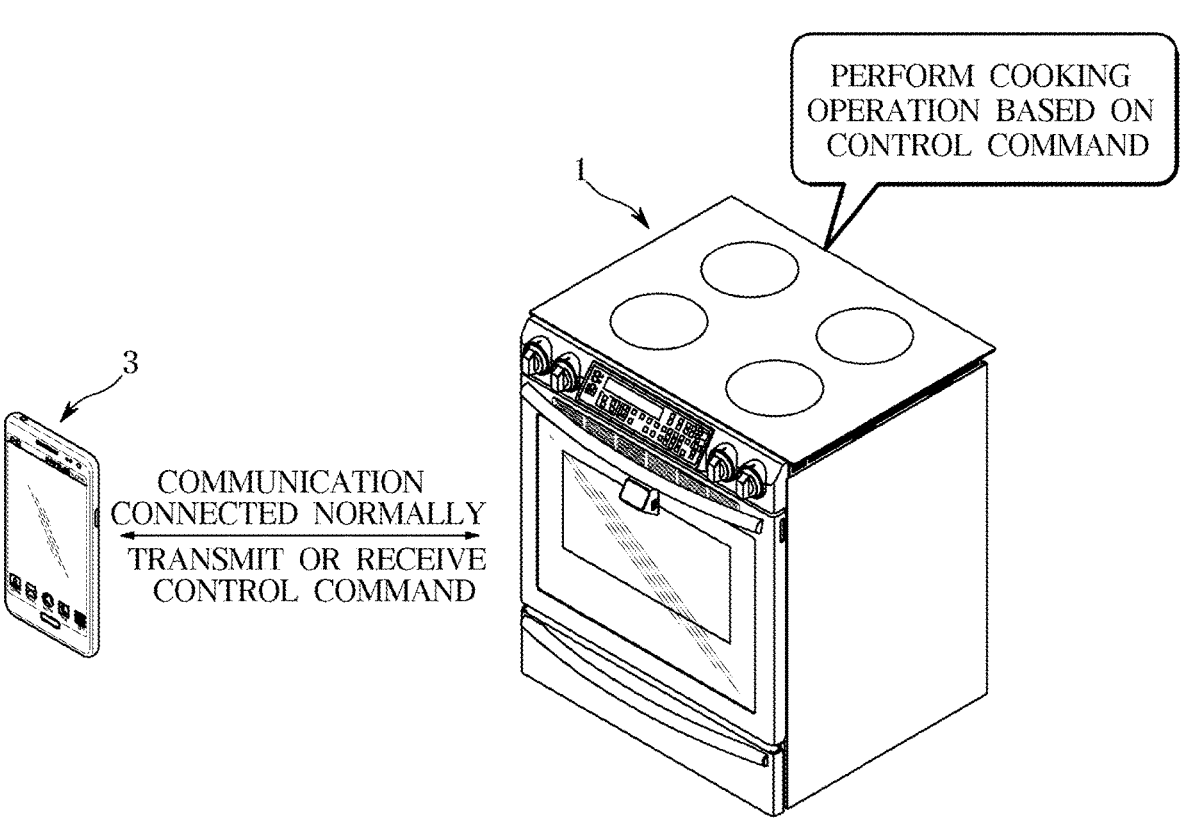
FIG. 6 illustrates an occasion when a cooking apparatus operates based on communication with a user terminal, according to an embodiment of the disclosure.

FIG. 6 illustrates an occasion when a cooking apparatus operates based on communication with a user terminal according to an embodiment of the disclosure.

Figure 7:
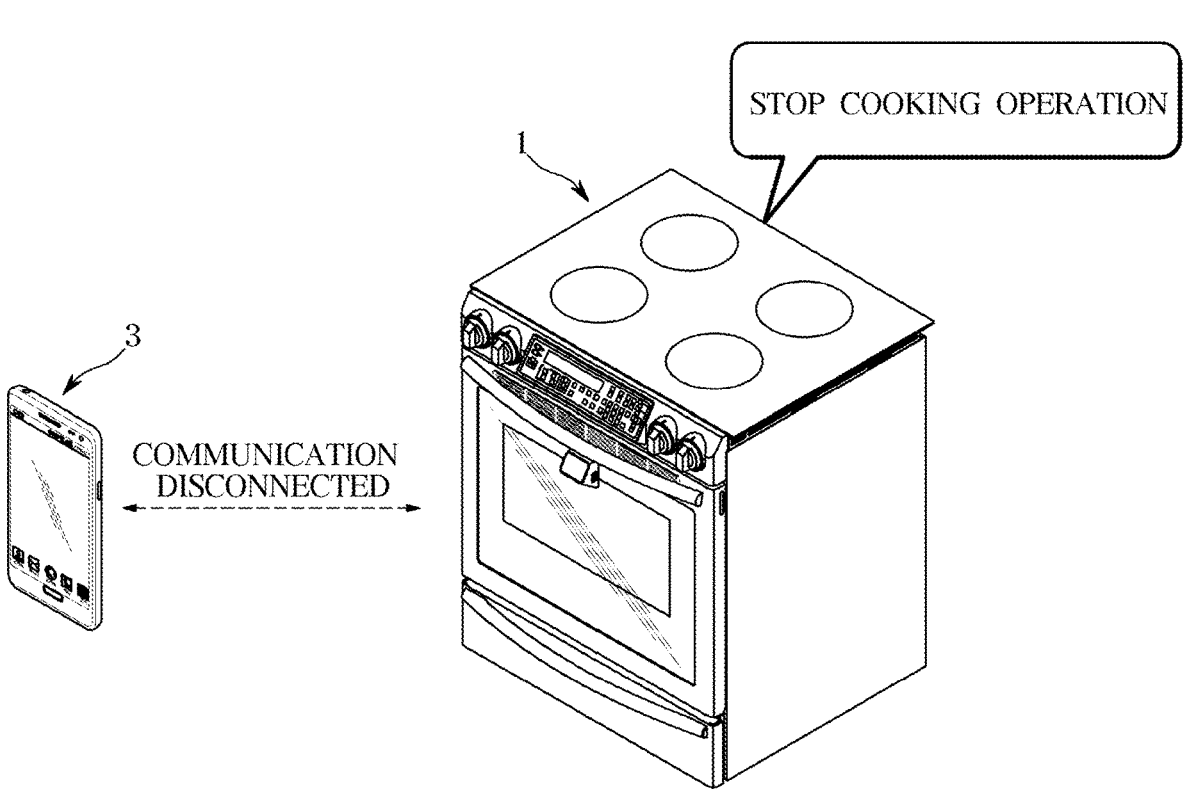
FIG. 7 illustrates an occasion when a cooking apparatus stops a cooking operation in response to disconnection of communication with a user terminal, according to an embodiment of the disclosure.

FIG. 7 illustrates an occasion when a cooking apparatus stops a cooking operation in response to disconnection of communication with a user terminal according to an embodiment of the disclosure.

Referring to FIG. 6, the cooking apparatus 1 according to an embodiment may control the cooking module 150 to perform a cooking operation based on a control command received from the user terminal 3. Specifically, when the communication module 110 receives a control command from the user terminal 3 through the AP 2, the controller 140 may control the cooking module 150 to perform a cooking operation based on the received control command.

As such, the cooking apparatus 1 may perform the cooking operation based on transmission or reception of a control command to or from the user terminal 3 when the communication with the user terminal 3 is normally connected. In this case, the control command transmitted from the user terminal 3 may be determined by a user input to the user terminal 3, and forwarded to the cooking apparatus 1 through the server 4 and the AP 2 over a network.

Referring to FIG. 7, the cooking apparatus 1 according to an embodiment may stop the cooking operation performed based on the control command received from the user terminal 3 when communication with the user terminal 3 is disconnected.

When the user is unable to remotely control the cooking apparatus 1 because the communication with the user terminal 3 is disconnected, the cooking apparatus 1 that is performing a heating operation may cause, by nature, a problem, such as fire, explosion, gas leakage, product overheating, or burn.

Hence, the cooking apparatus 1 according to an embodiment may stop the cooking operation when the communication with the user terminal 3 is disconnected, thereby preventing safety problems.

The case that the cooking apparatus 1 determines that communication with the user terminal 3 is disconnected will now be described in detail.

Figure 8:
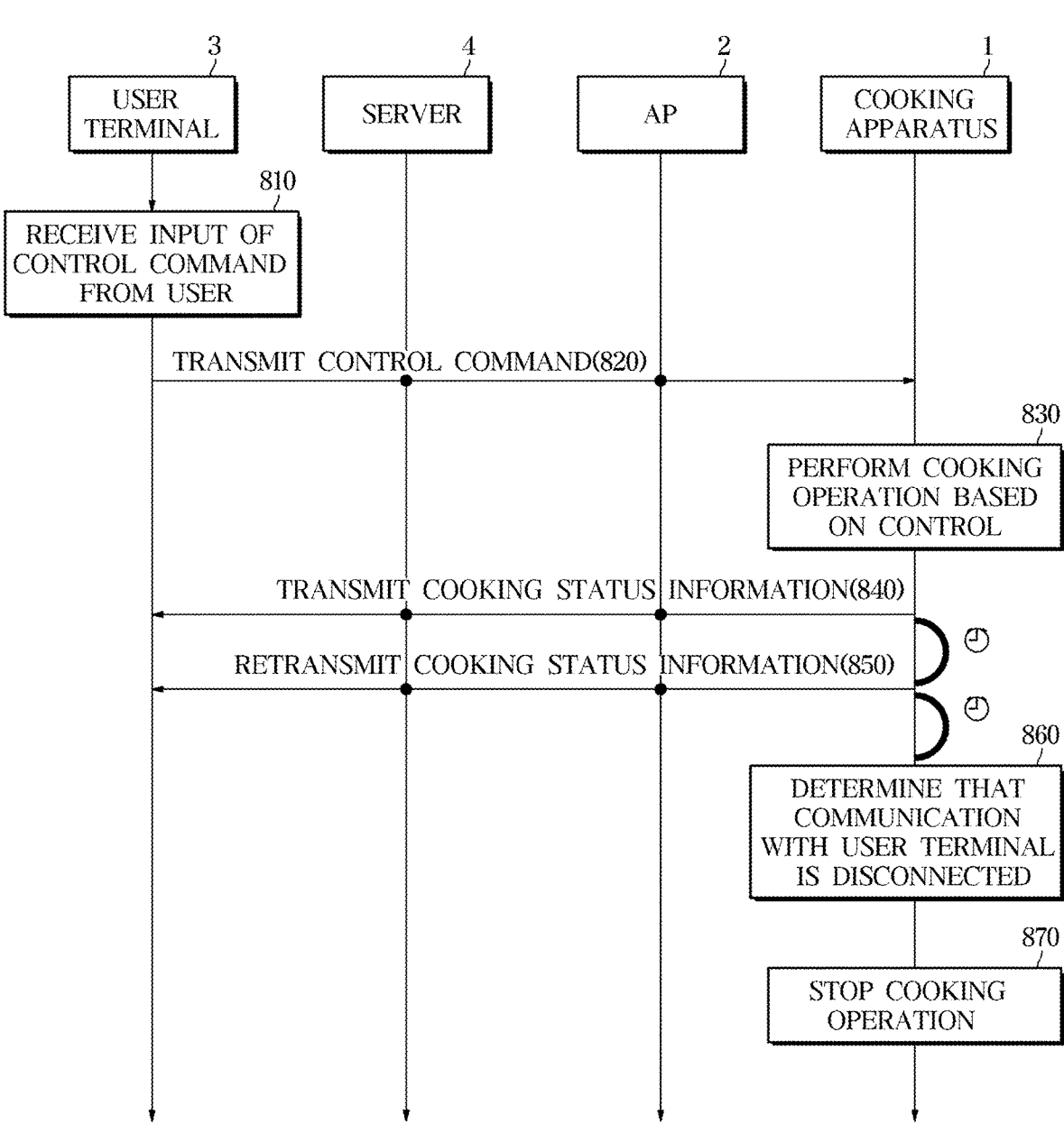
FIG. 8 is a signal sequence chart of an occasion when a cooking apparatus determines disconnection of communication with a user terminal based on a failure of receiving acknowledgment (ACK), according to an embodiment of the disclosure.

FIG. 8 is a signal sequence chart of an occasion when a cooking apparatus determines disconnection of communication with a user terminal based on a failure of receiving ACK according to an embodiment of the disclosure.

Figure 9:
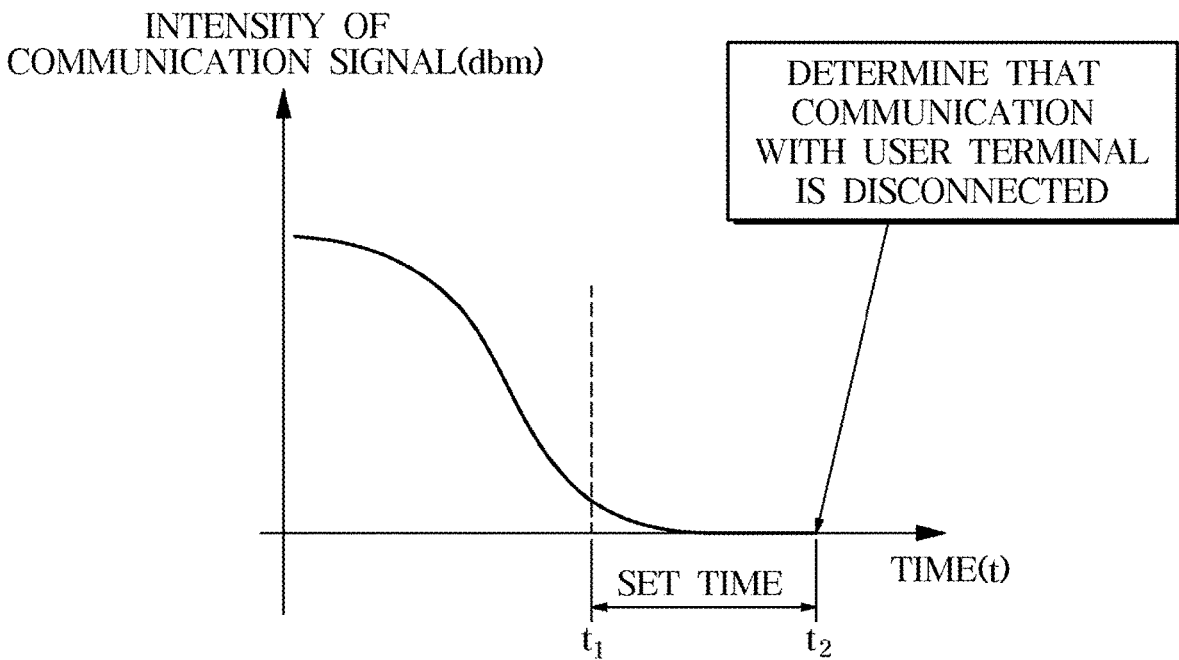
FIG. 9 is a signal sequence chart of an occasion when a cooking apparatus determines disconnection of communication with a user terminal based on a communication signal, according to an embodiment of the disclosure.

FIG. 9 is a signal sequence chart of an occasion when a cooking apparatus determines disconnection of communication with a user terminal based on a communication signal according to an embodiment of the disclosure.

Figure 10:
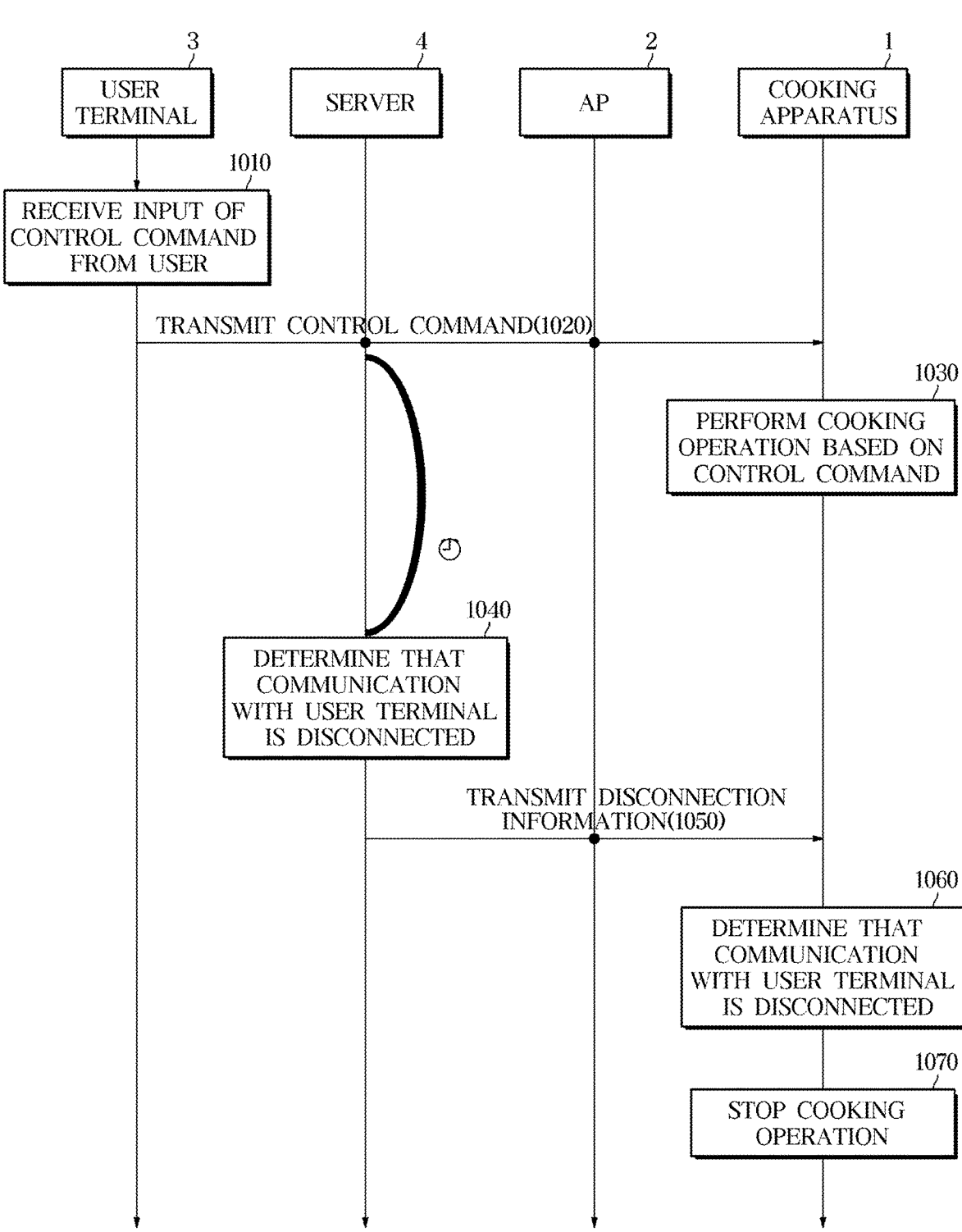
FIG. 10 is a signal sequence chart of an occasion when a cooking apparatus determines disconnection of communication with a user terminal based on information received from a server, according to an embodiment of the disclosure.

FIG. 10 is a signal sequence chart of an occasion when a cooking apparatus determines disconnection of communication with a user terminal based on information received from a server according to an embodiment of the disclosure.

Referring to FIG. 8, the cooking apparatus 1 according to the embodiment may control the communication module 110 to transmit cooking status information to the user terminal 3, and determine that communication with the user terminal 3 is disconnected in response to a failure of reception of ACK from the user terminal 3.

Specifically, the user terminal 3 may receive an input of a control command from the user in operation 810, and transmit the control command in operation 820. The control command may be about a cooking operation, and may be a command to control the cooking operation to be started or stopped, a cooking temperature to be set, a cooking mode to be selected, a cooking time to be set, or the like.

The control command transmitted from the user terminal 3 may be forwarded to the cooking apparatus 1 through the server 4 and the AP 2. In some embodiments of the disclosure, however, the control command may be forwarded to the cooking apparatus 1 only through the AP 2 without passing through the server 4.

In an embodiment of the disclosure, the cooking apparatus 1 may perform the cooking operation based on the control command in operation 830, and transmit cooking status information corresponding to the cooking operation in operation 840. In this case, the cooking apparatus 1 may retransmit the cooking status information when a timeout of ACK for the cooking status information occurs in operation 850, determines that the communication with the user terminal 3 is disconnected when a timeout of ACK for the retransmitted cooking status information occurs in operation 860, and stop the cooking operation in operation 870.

In other words, when there is no ACK from the user terminal 3 for an ACK waiting time even after transmission of the cooking status information, the cooking apparatus 1 may retransmit the cooking status information to confirm connection of communication with the user terminal 3. In another embodiment of the disclosure, the cooking apparatus 1 may transmit extra information to confirm the connection of communication in addition to the cooking status information.

In response to another failure of receiving ACK for the retransmitted information, the cooking apparatus 1 may determine that communication with the user terminal 3 is disconnected and stop the cooking operation. Although one-time retransmission is described as an example in FIG. 8, information may be retransmitted multiple times to confirm disconnection of communication in another embodiment. Specifically, in some embodiments of the disclosure, the cooking apparatus 1 may control the communication module 110 to retransmit the cooking status information a preset number of times when ACK information for the cooking status information is not received from the user terminal 3, and determine that the communication with the user terminal 3 is disconnected when ACK is not received after the retransmission of the cooking status information.

Furthermore, in another embodiment of the disclosure, the cooking apparatus 1 may not retransmit any information for confirmation of disconnection of the communication, but may determine that the communication with the user terminal 3 is disconnected when there is no ACK for the cooking status information.

Referring to FIG. 9, in an embodiment of the disclosure, when the cooking apparatus 1 has not received any communication signal for a preset period of time $t_2-t_1$ from the AP 2 that relays communication with the user terminal 3, the cooking apparatus 1 may determine that the communication with the user terminal 3 is disconnected and stop the cooking operation.

In other words, when the communication module 110 has not received any communication signal (e.g., Wi-Fi signals) from the AP 2 for a certain period of time, the cooking apparatus 1 may determine that the communication with the AP 2 is disconnected and that communication with the user terminal 3 is also disconnected because of the disconnection of the communication with the AP 2, and stop the cooking operation.

Referring to FIG. 10, in an embodiment of the disclosure, when receiving information about disconnection from the user terminal 3 from the server 4, the cooking apparatus 1 may determine that communication with the user terminal is disconnected and stop the cooking operation.

Specifically, the user terminal 3 may receive an input of a control command from the user in operation 1010, and transmit the control command through the server 4 and the AP 2 in operation 1020. The cooking apparatus 1 may perform a cooking operation based on the control command, in operation 1030.

In this case, when the server 4 has not received access information for a preset period of time from the user terminal 3 that transmitted the control command, the server 4 may determine that communication with the user terminal 3 is disconnected in operation 1040 and transmit disconnection information to the cooking apparatus 1 in operation 1050. The disconnection information is information indicating disconnection of communication with the user terminal 3.

In an embodiment of the disclosure, when receiving the disconnection information from the server 4, the cooking apparatus 1 may determine that communication with the user terminal 3 is disconnected in operation 1060 and stop the cooking operation in operation 1070.

As such, the cooking apparatus 1 may determine that communication with the user terminal 3 is disconnected based on a failure of receiving ACK for the cooking status information, a failure of receiving a communication signal from the AP 2, or reception of the disconnection information from the server 4, and stop the cooking operation based on the disconnection of communication with the user terminal 3.

How the cooking apparatus 1 determines that communication is disconnected was described in detail. Control descriptions of an occasion when the cooking apparatus 1 stops the cooking operation will now be described in detail.

FIG. 11 illustrates control descriptions of an occasion when a cooking apparatus stops a cooking operation according to an embodiment of the disclosure.

Referring to FIG. 11, the cooking apparatus 1 according to the embodiment may have different control descriptions at the time of stopping the cooking operation depending on the type of the cooking module 150. For example, the cooking apparatus 1 may control to stop the operation of the cooking module 150 based on the type of the cooking module 150, when the communication with the user terminal 3 is disconnected and the cooking apparatus 1 stops the cooking operation.

Specifically, in some embodiments of the disclosure, when the cooking module 150 has a type of generating heat with electricity, the cooking apparatus 1 may send an off signal to the cooking module 150 to control the cooking module 150 to stop the cooking operation.

Furthermore, in another embodiment of the disclosure, when the cooking module 150 has a type of generating heat by burning gas, the cooking apparatus 1 may control the cooking module 150 to stop the cooking operation by controlling a valve to close a gas supply tube for supplying gas to the cooking module 150. The valve may be provided to open or close the gas supply tube connected to the cooking module 150. The valve may be a solenoid valve, without being limited thereto.

The control descriptions of an occasion when the cooking apparatus 1 stops the cooking operation were described in detail. How the cooking apparatus 1 stops the cooking operation depending on a cooking progress state will now be described in detail.

Figure 12:
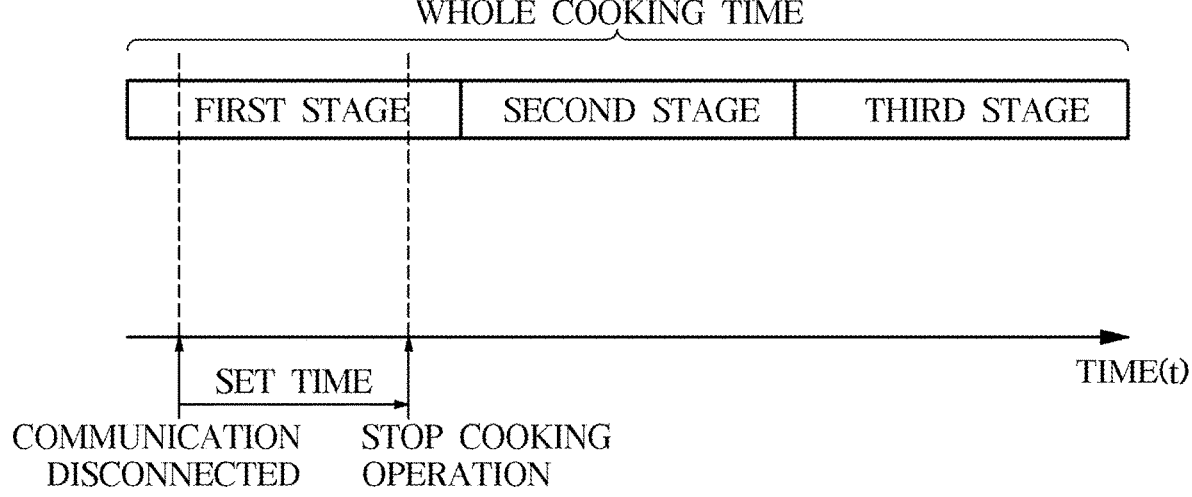
FIG. 12 illustrates an occasion when a cooking apparatus stops a cooking operation based on a cooking progress stage, according to an embodiment of the disclosure.

FIG. 12 illustrates an occasion when a cooking apparatus stops a cooking operation based on a cooking progress stage according to an embodiment of the disclosure.

Figure 13:
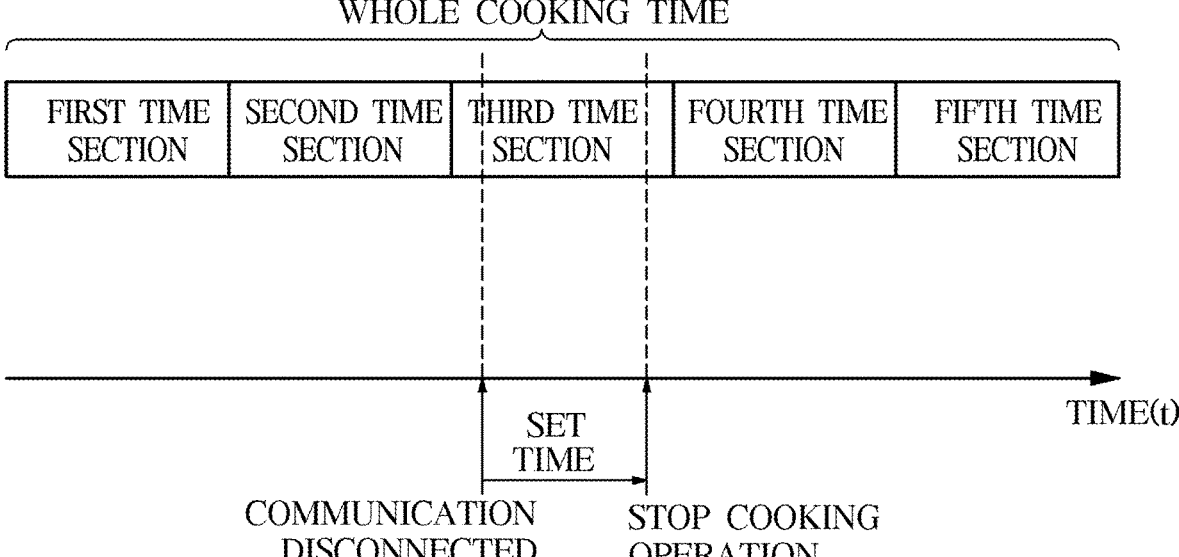
FIG. 13 illustrates an occasion when a cooking apparatus stops a cooking operation based on a cooking progress time section, according to an embodiment of the disclosure.

FIG. 13 illustrates an occasion when a cooking apparatus stops a cooking operation depending on a cooking progress time section according to an embodiment of the disclosure.

Referring to FIG. 12, the cooking apparatus 1 according to an embodiment may control the cooking module 150 to stop a cooking operation after a preset period of time based on a cooking progress stage when communication with the user terminal 3 is disconnected. In this case, a whole cooking time may be divided into a plurality of cooking progress stages.

Specifically, the cooking apparatus 1 may stop the cooking operation after the passage of a preset period of time when an ongoing cooking stage corresponds to a preset cooking stage (e.g., a first stage (preheating stage)).

In this case, the cooking apparatus 1 may control the communication module 110 to try communication with the user terminal 3 a preset number of times before controlling the cooking module 150 to stop the cooking operation after the preset period of time. The cooking apparatus 1 may stop the cooking operation when it is determined that communication with the user terminal 3 is disconnected despite the communication trial.

As such, by taking into account an occasion when the communication with the user terminal 3 is temporarily disconnected due to a temporary network communication failure, the cooking apparatus 1 may determine whether to stop the cooking operation after further performing the cooking operation for a preset period of time depending on a cooking progress stage. In this case, the cooking progress stage set to further perform the cooking operation for a preset period of time may correspond to a stage with a relatively low-temperature of the cooking module 150, such as a preheating stage, a cooling stage, or the like, which is less likely to cause such problems as fire, explosion, overheat, burn, or the like.

Referring to FIG. 13, the cooking apparatus 1 according to an embodiment may divide a whole cooking time into a plurality of time sections, determine an ongoing time section among the plurality of time sections when communication with the user terminal 3 is disconnected, and control the cooking module 150 to stop the cooking operation after a preset period of time corresponding to the determined time section.

For example, when determining that the communication with the user terminal 3 is disconnected in the third time section in the whole cooking time, the cooking apparatus 1 may control the cooking module 150 to stop the cooking operation after a preset period of time corresponding to the third time section.

The preset period of time corresponding to each section may be set differently. For example, the preset period of time corresponding to each section may be set to be inversely proportional to the temperature of the cooking module 150 in the corresponding time section.

In this case, the cooking apparatus 1 may control the communication module 110 to try communication with the user terminal 3 a preset number of times before controlling the cooking module 150 to stop the cooking operation after a preset period of time. The cooking apparatus 1 may stop the cooking operation when it is determined that communication with the user terminal 3 is disconnected despite the communication trial.

As such, by taking into account an occasion when the communication with the user terminal 3 is temporarily disconnected due to a temporary network communication failure, the cooking apparatus 1 may determine whether to stop the cooking operation after further performing the cooking operation for a preset period of time depending on the ongoing time section of the whole cooking time.

How the cooking apparatus 1 stops the cooking operation based on a cooking progress state was described in detail. An occasion when the cooking apparatus 1 resumes the cooking operation based on restoration of connection of communication with the user terminal 3 will now be described in detail.

Figure 14:
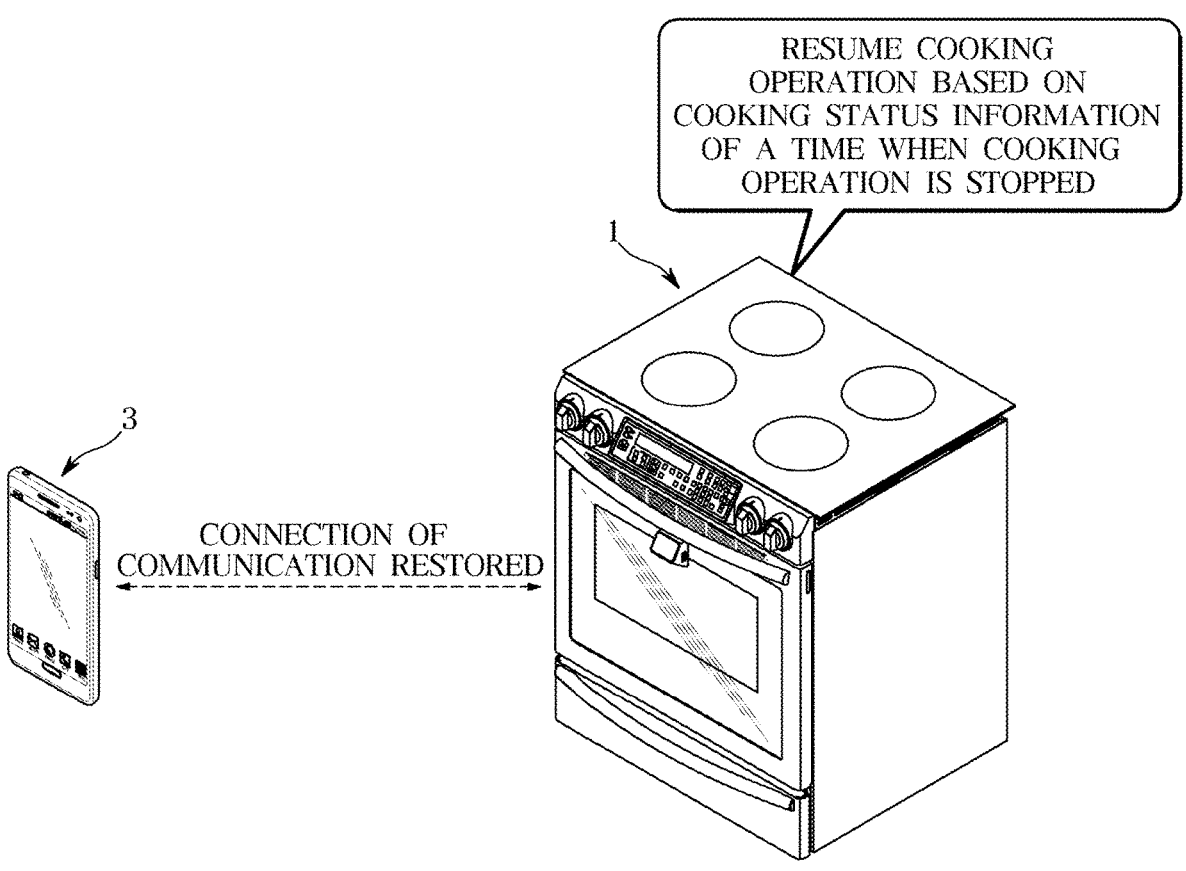
FIG. 14 illustrates an occasion when a cooking apparatus resumes a cooking operation in response to restoration of connection of communication with a user terminal, according to an embodiment of the disclosure.

FIG. 14 illustrates an occasion when a cooking apparatus resumes a cooking operation in response to restoration of communication with a user terminal according to an embodiment of the disclosure.

Figure 15:
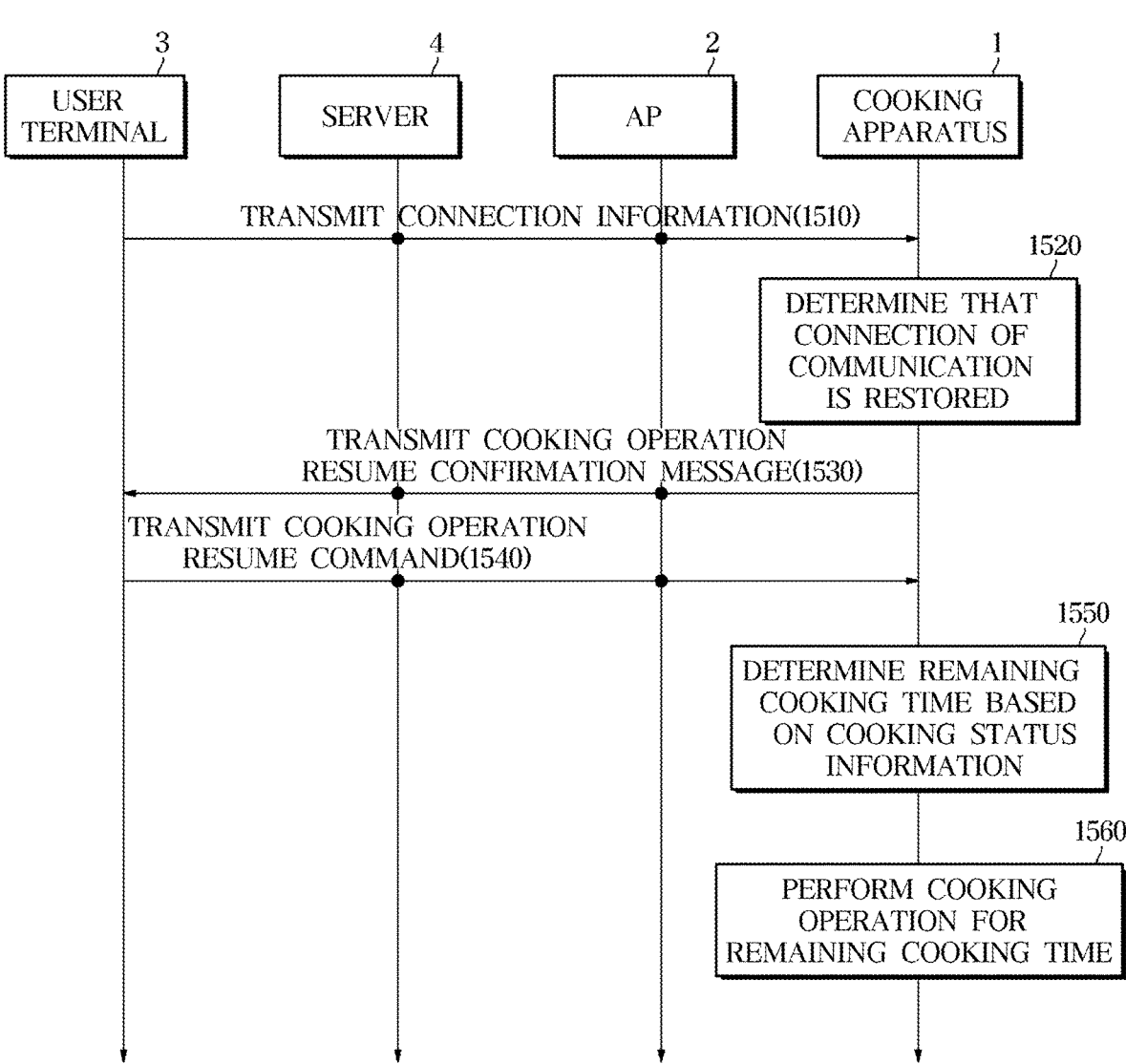
FIG. 15 is a signal sequence chart of an occasion when a cooking apparatus resumes a cooking operation based on a command to resume a cooking operation according to an embodiment of the disclosure.

FIG. 15 is a signal sequence chart of an occasion when a cooking apparatus resumes a cooking operation based on a command to resume a cooking operation according to an embodiment of the disclosure.

Figure 16:
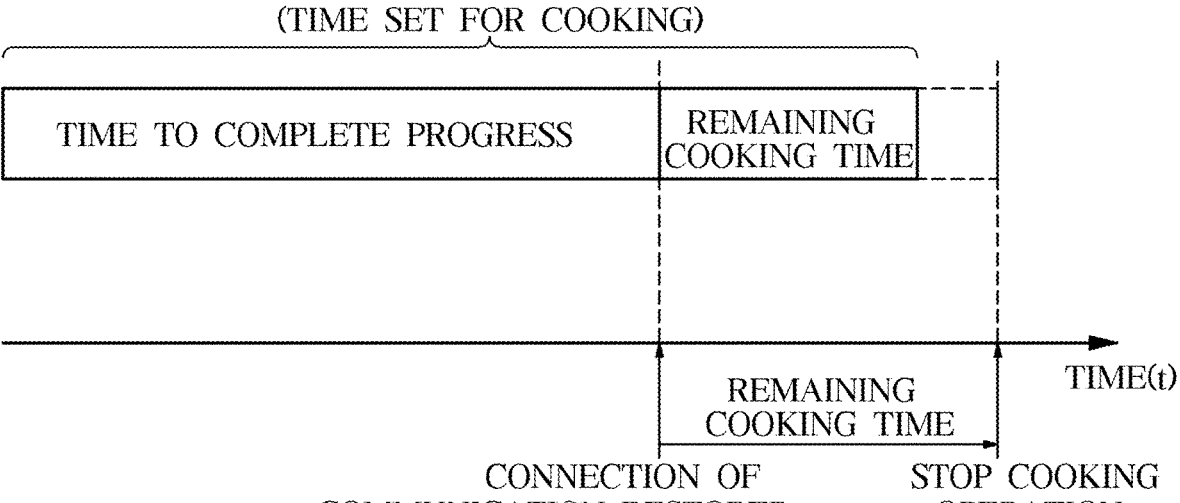
FIG. 16 illustrates an occasion when a cooking apparatus determines a remaining cooking time, according to an embodiment of the disclosure.

FIG. 16 illustrates an occasion when a cooking apparatus determines a remaining cooking time according to an embodiment of the disclosure.

Referring to FIG. 14, in an embodiment of the disclosure, the cooking apparatus 1 may determine cooking status information of a time when the communication with the user terminal 3 is disconnected, and control the cooking module 150 to resume the cooking operation based on the cooking status information when connection of the communication with the user terminal 3 is restored.

In other words, the cooking apparatus 1 may resume the cooking operation based on cooking status information stored when the cooking operation is stopped, when connection of the communication with the user terminal 3 is restored after the cooking operation is stopped due to the disconnection of communication with the user terminal 3, thereby guaranteeing cooking continuity.

In this case, the cooking status information stored when the cooking operation is stopped may include information about a cooking mode, a temperature set for cooking, a time set for cooking, a cooking start time, a cooking progress time, a remaining cooking time, a temperature in the cooking module, or the like, of the stopped cooking operation.

In other words, to resume the stopped cooking operation based on the cooking status information stored when the cooking operation is stopped when connection of the communication with the user terminal 3 is restored, the cooking apparatus 1 may control the cooking module 150 to perform the cooking operation in the cooking mode at the set temperature for the remaining cooking time.

Referring to FIG. 15, the user terminal 3 may transmit connection information indicating connection of communication to the cooking apparatus 1 when the connection of communication with the cooking apparatus 1 is restored, in operation 1510.

On receiving the connection information from the user terminal 3, the cooking apparatus 1 may determine that connection of the communication with the user terminal 3 is restored in operation 1520, and transmit a cooking operation resume confirmation message to the user terminal 3 in operation 1530. In this case, the cooking operation resume confirmation message may include a message asking whether to resume the cooking operation, and may also include a message notifying that the cooking operation is stopped due to disconnection of communication.

The user terminal 3 may transmit a cooking operation resume command to the cooking apparatus 1 based on a user input in response to the cooking operation resume confirmation message, in operation 1540. In other words, the user may control the cooking apparatus 1 to resume the cooking operation by inputting the resume command to the user terminal 3 when the user checks the cooking operation resume confirmation message.

The cooking apparatus 1 may determine a remaining cooking time based on the cooking status information when the cooking operation resume command is received from the user terminal 3 in operation 1550, and perform the cooking operation for the remaining cooking time in operation 1560.

Referring to FIG. 16, the cooking apparatus 1 may determine a difference between the temperature set for cooking of the cooking module 150 and a current temperature of the cooking module 150 based on the cooking status information, and control the determined remaining cooking time to increase to be proportional to the determined difference in temperature.

Specifically, when the current temperature of the cooking module 150 is lower than the temperature set for cooking in the cooking status information, the remaining cooking time in the cooking status information may be controlled to increase to compensate for the dropped temperature of the cooking module 150. For example, the temperature of the cooking chamber 151 dropped from the deactivation may be compensated by adding 3 minutes to the remaining cooking time when the current temperature is more than 10 degrees lower than the set temperature.

An embodiment of a method of controlling the cooking apparatus 1 will now be described according to an aspect. For the method of controlling the cooking apparatus 1, the cooking apparatus 1 in the aforementioned embodiments may be used. Hence, what are described above with reference to FIGS. 1 to 16 may be equally applied in the following method of controlling the cooking apparatus 1.

Figure 17:
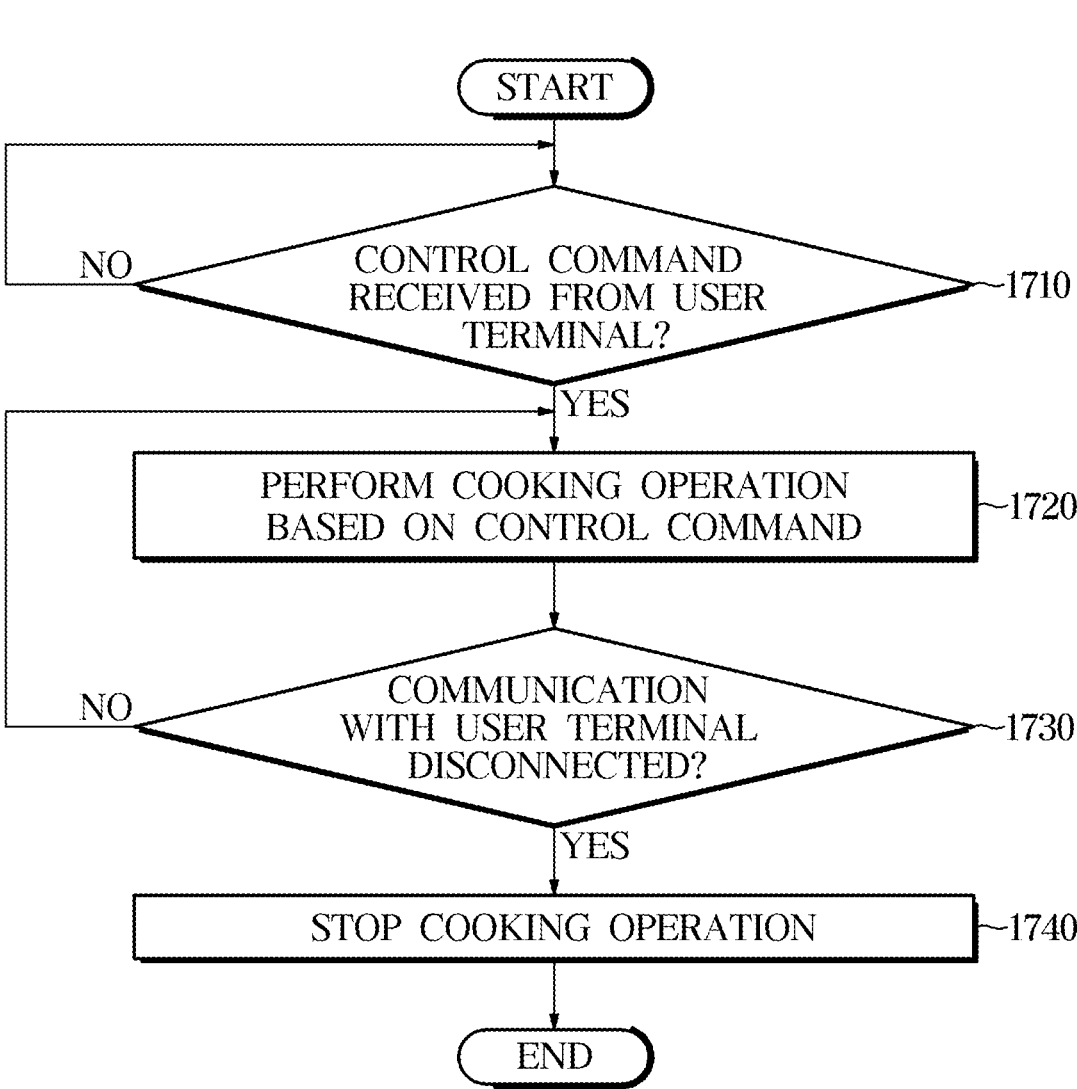
FIG. 17 is a flowchart of a case of stopping a cooking operation in response to disconnection of communication with a user terminal in a method of controlling a cooking apparatus, according to an embodiment of the disclosure.

FIG. 17 is a flowchart of a case of stopping a cooking operation in response to disconnection of communication with a user terminal in a method of controlling the cooking apparatus according to an embodiment of the disclosure.

Referring to FIG. 17, on receiving a control command from the user terminal 3 in operation 1710, the cooking apparatus 1 according to an embodiment may perform a cooking operation according to the control command, in operation 1720.

Furthermore, when communication with the user terminal 3 is disconnected in operation 1730, the cooking apparatus 1 according to an embodiment may stop the cooking operation in operation 1740.

When the user is unable to remotely control the cooking apparatus 1 because the communication with the user terminal 3 is disconnected, the cooking apparatus 1 that is performing a heating operation may cause, by nature, a problem, such as fire, explosion, gas leakage, product overheating, or burn.

Hence, the cooking apparatus 1 according to an embodiment may stop the cooking operation when the communication with the user terminal 3 is disconnected, thereby preventing safety problems.

Figure 18:
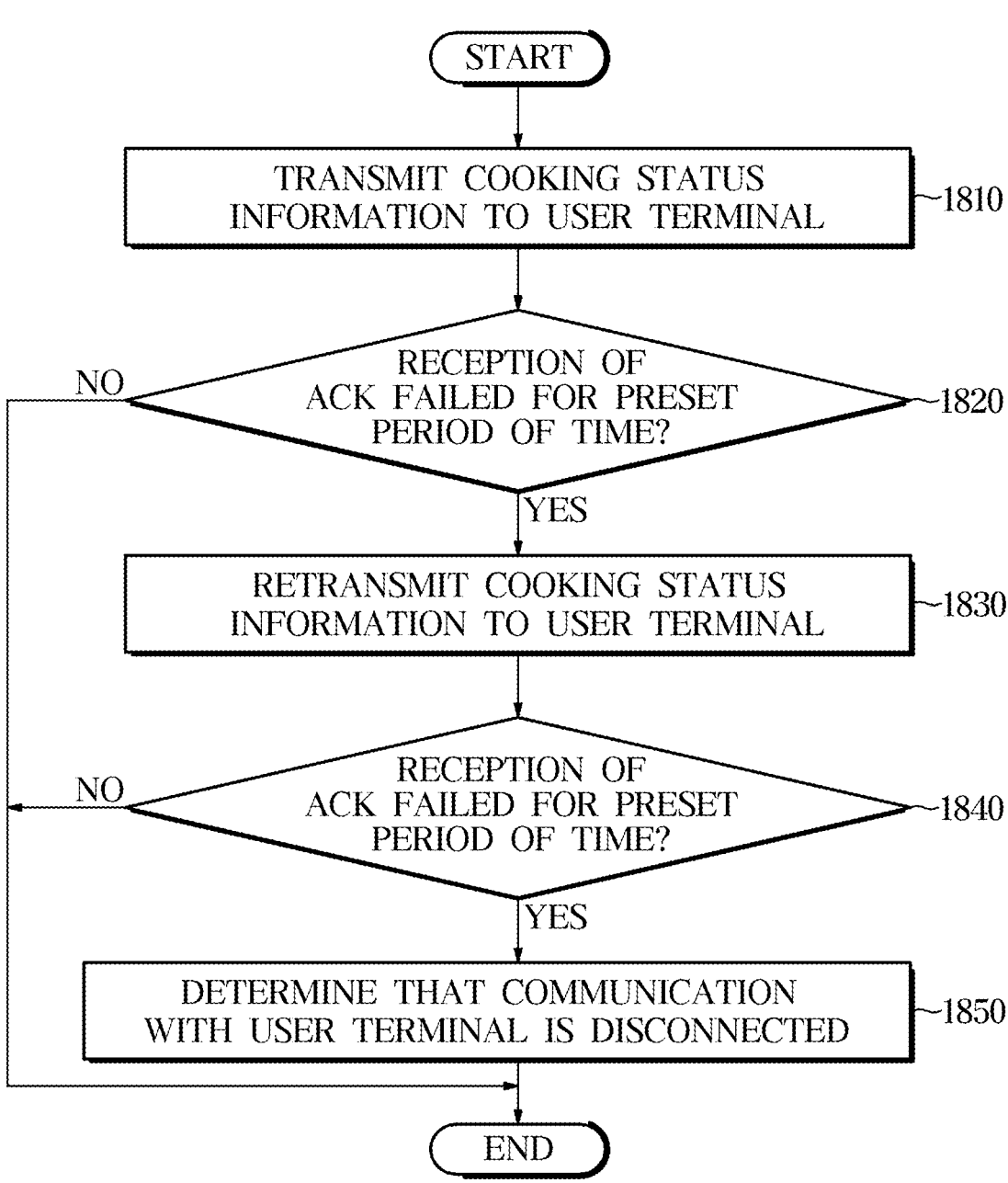
FIG. 18 is a flowchart of a case of determining disconnection of communication with a user terminal based on a failure of receiving ACK in a method of controlling a cooking apparatus, according to an embodiment of the disclosure.

FIG. 18 is a flowchart of a case of determining disconnection of communication with a user terminal based on a failure of receiving ACK in a method of controlling a cooking apparatus according to an embodiment of the disclosure.

Referring to FIG. 18, the cooking apparatus 1 according to an embodiment may transmit cooking status information to the user terminal 3 in operation 1810, and when no ACK is received for a set period of time in operation 1820, retransmit the cooking status information to the user terminal 3 in operation 1830.

In other words, when there is no ACK from the user terminal 3 for an ACK waiting time even after transmission of the cooking status information, the cooking apparatus 1 may retransmit the cooking status information to confirm connection of communication with the user terminal 3. In another embodiment of the disclosure, the cooking apparatus 1 may transmit extra information to confirm the connection of communication in addition to the cooking status information.

Furthermore, when no ACK is received a set time after the cooking status information is retransmitted to the user terminal 3 in operation 1840, the cooking apparatus 1 may determine that communication with the user terminal 3 is disconnected in operation 1850.

Although one-time retransmission is described as an example in FIG. 18, information may be retransmitted multiple times to confirm disconnection of communication in another embodiment. Specifically, in some embodiments of the disclosure, the cooking apparatus 1 may control the communication module 110 to retransmit the cooking status information a preset number of times when ACK information for the cooking status information is not received from the user terminal 3, and determine that the communication with the user terminal 3 is disconnected when ACK is not received after the retransmission of the cooking status information.

Furthermore, in another embodiment of the disclosure, the cooking apparatus 1 may not retransmit any information for confirmation of disconnection of the communication, but may determine that the communication with the user terminal 3 is disconnected when there is no ACK for the cooking status information.

Figure 19:
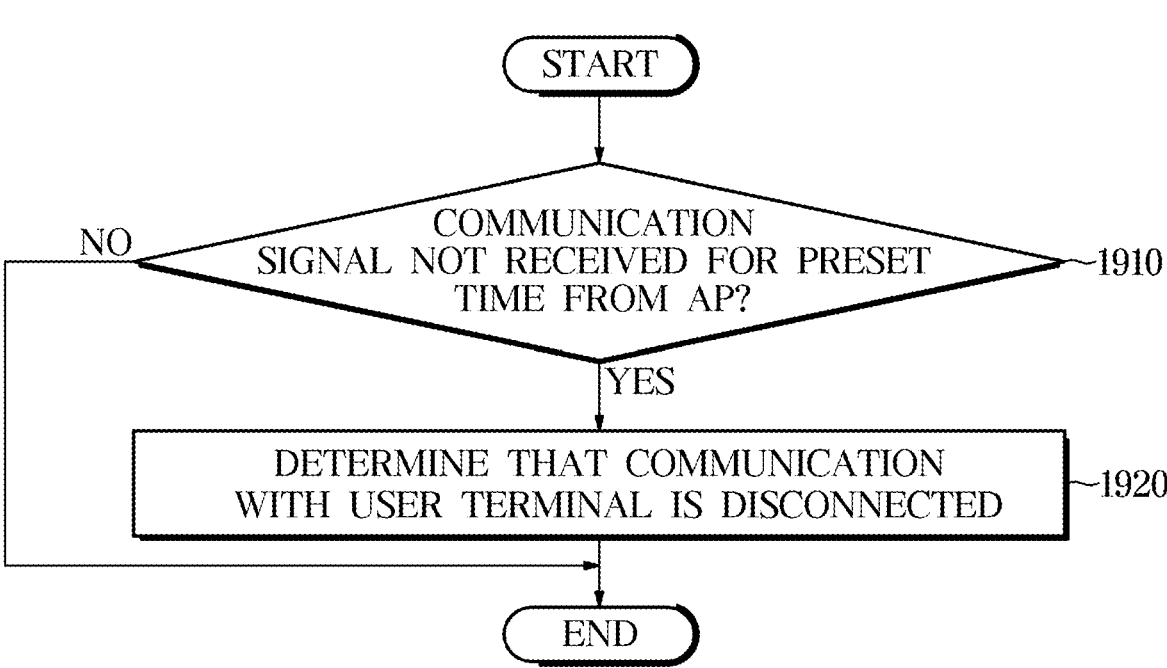
FIG. 19 is a flowchart of a case of determining disconnection of communication with a user terminal based on a communication signal in a method of controlling a cooking apparatus, according to an embodiment of the disclosure.

FIG. 19 is a flowchart of a case of determining disconnection of communication with a user terminal based on a communication signal in a method of controlling a cooking apparatus according to an embodiment of the disclosure.

Referring to FIG. 19, in the embodiment of the disclosure, when no communication signal is received from the AP 2 for a set period of time in operation 1910, the cooking apparatus 1 may determine that communication with the user terminal 3 is disconnected in operation 1920.

In other words, when the communication module 110 has not received any communication signal (e.g., Wi-Fi signals) from the AP 2 for a certain period of time, the cooking apparatus 1 may determine that the communication with the AP 2 is disconnected and that communication with the user terminal 3 is also disconnected because of the disconnection of the communication with the AP 2, and stop the cooking operation.

Figure 20:
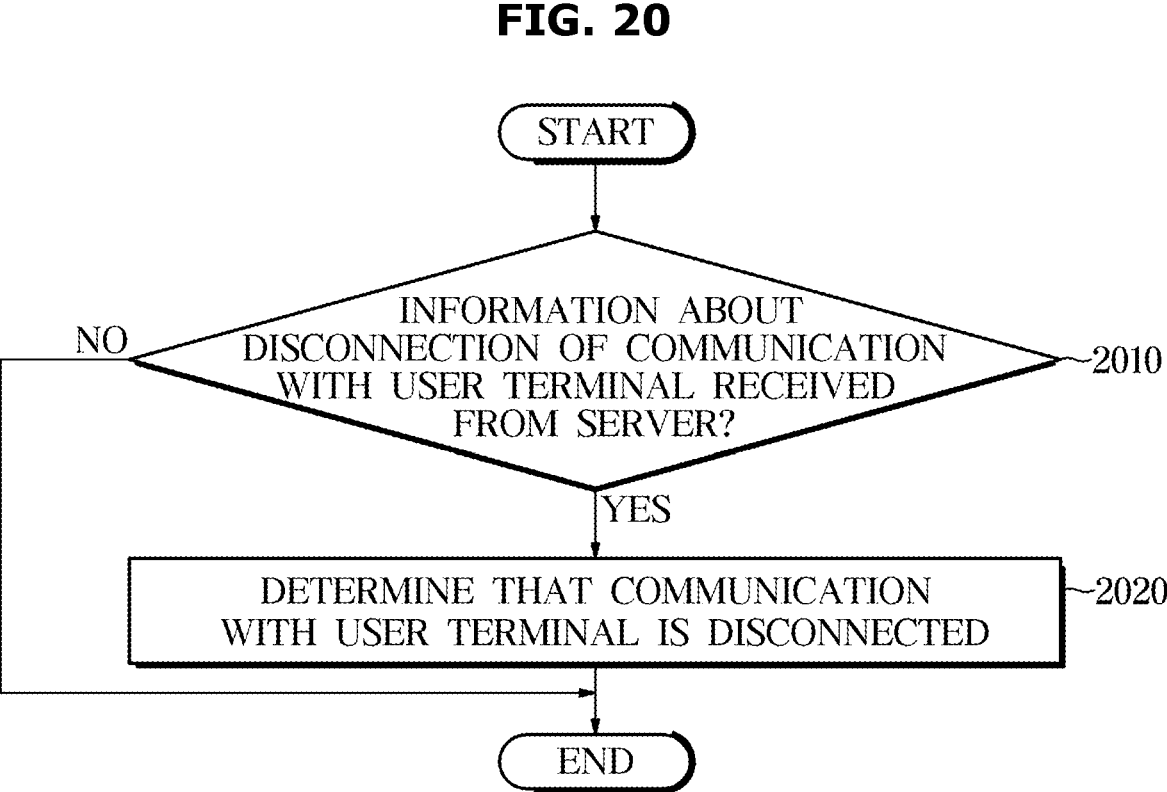
FIG. 20 is a flowchart of a case of determining disconnection of communication with a user terminal based on information received from a server in a method of controlling a cooking apparatus, according to an embodiment of the disclosure.

FIG. 20 is a flowchart of a case of determining disconnection of communication with a user terminal based on information received from a server in a method of controlling a cooking apparatus according to an embodiment of the disclosure.

Referring to FIG. 20, in the embodiment of the disclosure, when receiving information about disconnection of communication with the user terminal 3 from the server 4 in operation 2010, the cooking apparatus 1 may determine that communication with the user terminal 3 is disconnected in operation 2020.

Specifically, the user terminal 3 may receive an input of a control command from the user, and transmit the control command through the server 4 and the AP 2. The cooking apparatus 1 may perform a cooking operation based on the control command.

In this case, when the server 4 has not received access information for a preset period of time from the user terminal 3 that transmitted the control command, the server 4 may determine that communication with the user terminal 3 is disconnected in operation 1040 and transmit disconnection information to the cooking apparatus 1. The disconnection information is information indicating disconnection of communication with the user terminal 3.

In an embodiment of the disclosure, when receiving the disconnection information from the server 4, the cooking apparatus 1 may determine that communication with the user terminal 3 is disconnected and stop the cooking operation.

Figure 21:
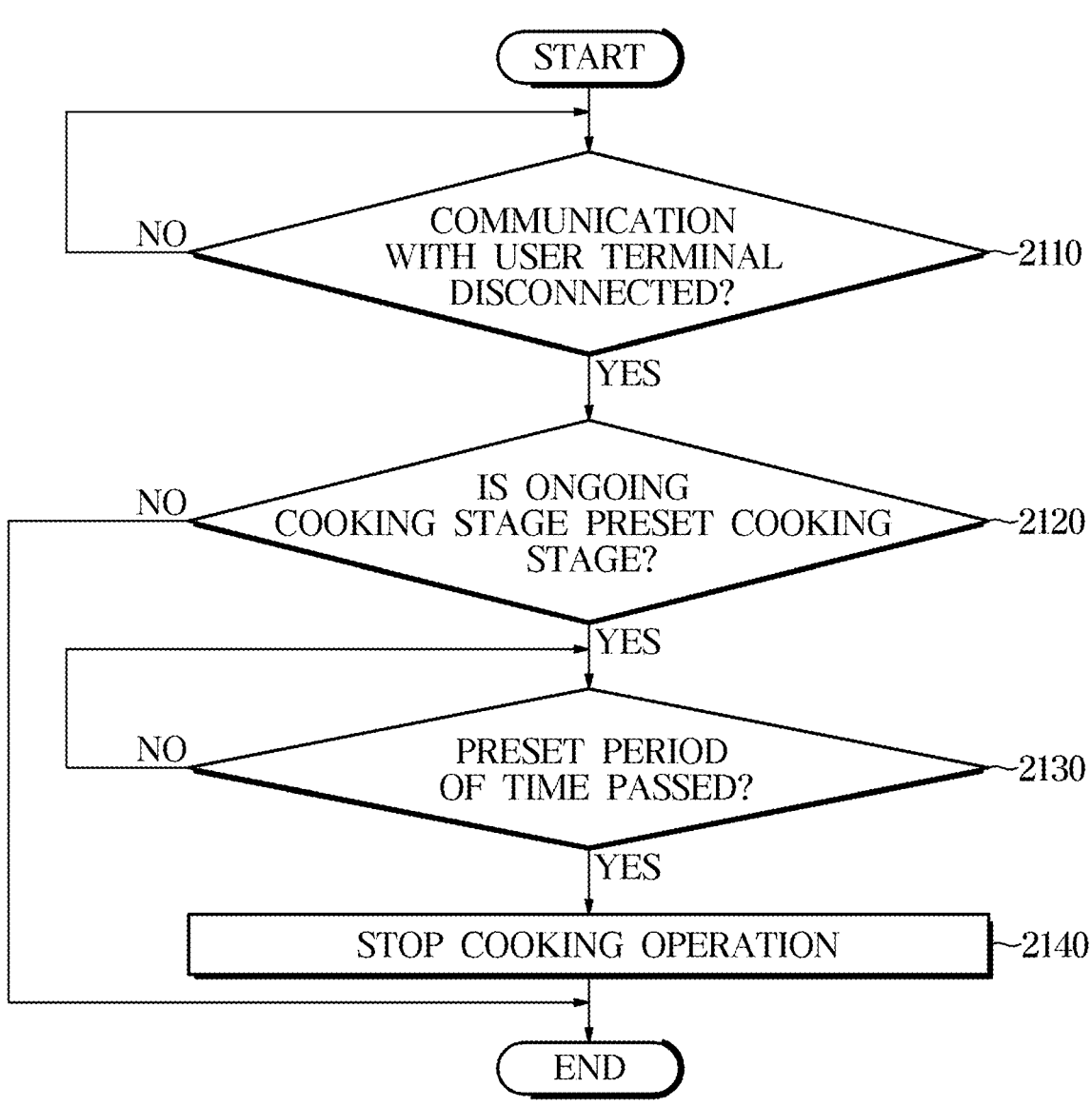
FIG. 21 is a flowchart of a case of stopping a cooking operation in a preset period of time depending on a cooking stage in a method of controlling a cooking apparatus, according to an embodiment of the disclosure.

FIG. 21 is a flowchart of a case of stopping a cooking operation in a preset period of time depending on a cooking stage in a method of controlling a cooking apparatus according to an embodiment of the disclosure.

Referring to FIG. 21, when communication with the user terminal 3 is disconnected in operation 2110 and an ongoing cooking stage is a preset cooking stage in operation 2120, after the passage of a preset period of time in operation 2130, the cooking apparatus 1 may stop the cooking operation in operation 2140.

Specifically, the cooking apparatus 1 may stop the cooking operation after the passage of a preset period of time when the current cooking stage corresponds to a preset cooking stage (e.g., a first stage (preheating stage)).

In this case, the cooking apparatus 1 may control the communication module 110 to try communication with the user terminal 3 a preset number of times before controlling the cooking module 150 to stop the cooking operation after the preset period of time. The cooking apparatus 1 may stop the cooking operation when it is determined that communication with the user terminal 3 is disconnected despite the communication trial.

As such, by taking into account an occasion when the communication with the user terminal 3 is temporarily disconnected due to a temporary network communication failure, the cooking apparatus 1 may determine whether to stop the cooking operation after further performing the cooking operation for a preset period of time depending on a cooking progress stage. In this case, the cooking progress stage set to further perform the cooking operation for a preset period of time may correspond to a stage with a relatively low-temperature of the cooking module 150, such as a preheating stage, a cooling stage, or the like, which is less likely to cause such problems as fire, explosion, overheat, burn, or the like.

Figure 22:
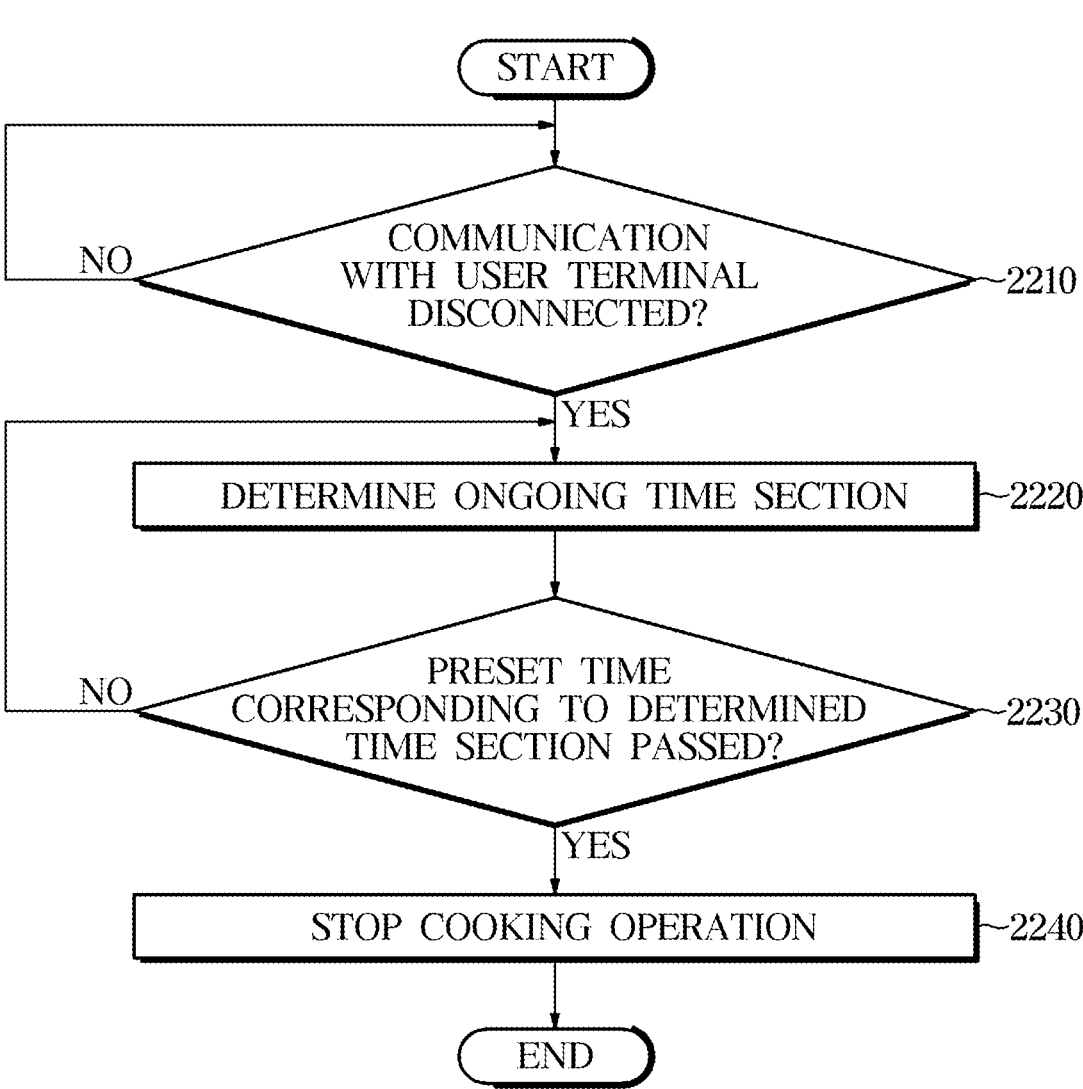
FIG. 22 is a flowchart of a case of stopping a cooking operation in a preset period of time depending on a time section in a method of controlling a cooking apparatus, according to an embodiment of the disclosure.

FIG. 22 is a flowchart of a case of stopping a cooking operation in a preset period of time depending on a time section in a method of controlling a cooking apparatus according to an embodiment of the disclosure.

Referring to FIG. 22, when communication with the user terminal 3 is disconnected in operation 2210, the cooking apparatus 1 may determine an ongoing time section in operation 2220 and stop the cooking operation in operation 2240 after the passage of a preset period of time corresponding to the determined time section in operation 2230.

For example, when determining that the communication with the user terminal 3 is disconnected in the third time section in the whole cooking time, the cooking apparatus 1 may control the cooking module 150 to stop the cooking operation after a preset period of time corresponding to the third time section.

The preset period of time corresponding to each section may be set differently. For example, the preset period of time corresponding to each section may be set to be inversely proportional to the temperature of the cooking module 150 in the corresponding time section.

In this case, the cooking apparatus 1 may control the communication module 110 to try communication with the user terminal 3 a preset number of times before controlling the cooking module 150 to stop the cooking operation after the preset period of time. The cooking apparatus 1 may stop the cooking operation when it is determined that communication with the user terminal 3 is disconnected despite the communication trial.

As such, by taking into account an occasion when the communication with the user terminal 3 is temporarily disconnected due to a temporary network communication failure, the cooking apparatus 1 may determine whether to stop the cooking operation after further performing the cooking operation for a preset period of time depending on the current time section of the whole cooking time.

Figure 23:
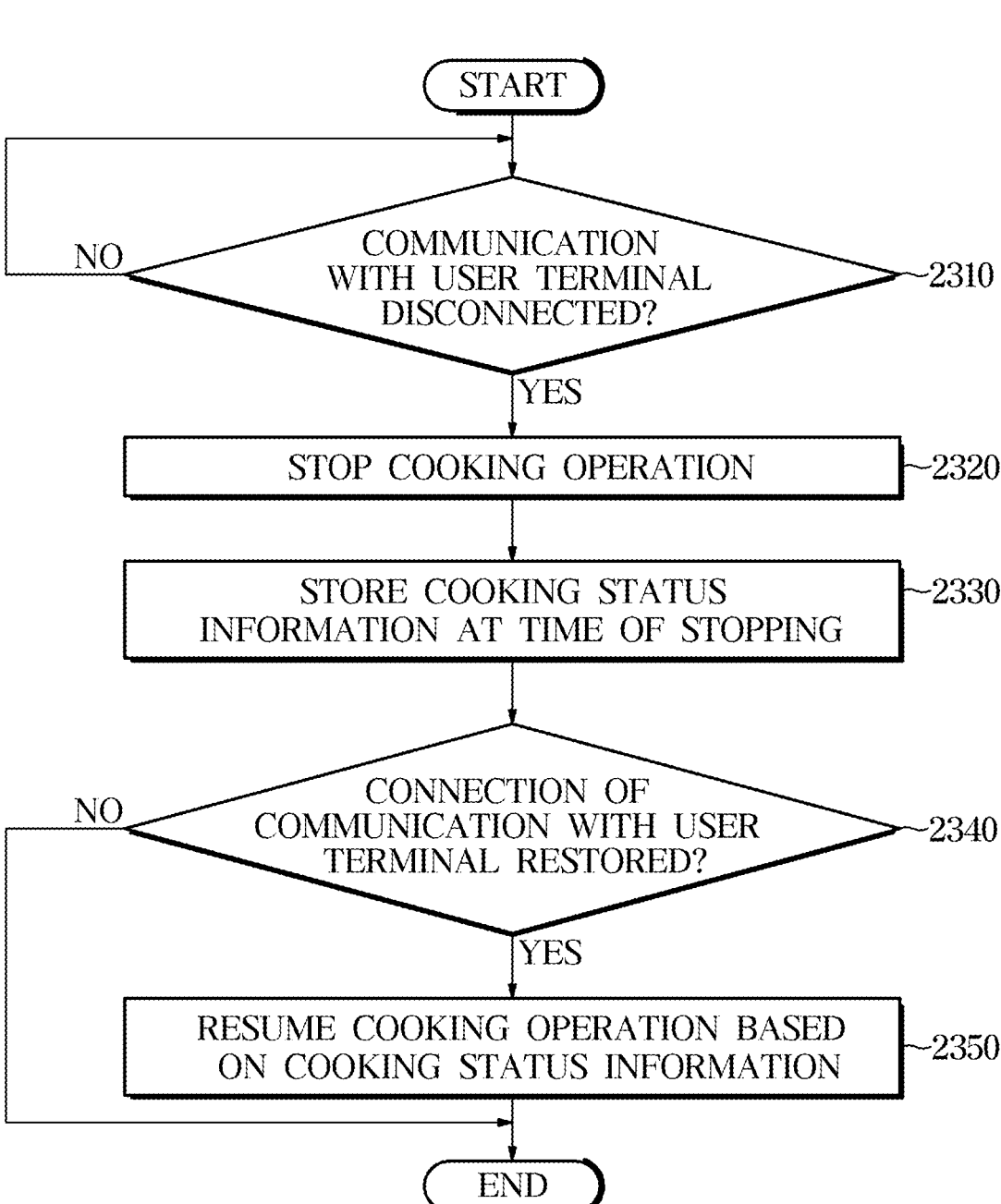
FIG. 23 is a flowchart of a case of resuming a cooking operation in a method of controlling a cooking apparatus, according to an embodiment of the disclosure.

FIG. 23 is a flowchart of a case of resuming a cooking operation in a method of controlling a cooking apparatus according to an embodiment of the disclosure.

Referring to FIG. 23, when communication with the user terminal 3 is disconnected in operation 2310, the cooking apparatus 1 according to an embodiment may stop the cooking operation in operation 2320.

In this case, the cooking apparatus 1 may store cooking status information at the time of the stopping, in operation 2330. For example, the cooking apparatus 1 may store the cooking status information of the time when the cooking operation is stopped in the storage 160.

The cooking status information stored when the cooking operation is stopped may include information about a cooking mode, a temperature set for cooking, a time set for cooking, a cooking start time, a cooking progress time, a remaining cooking time, a temperature in the cooking module, or the like, of the stopped cooking operation.

Furthermore, when the connection of communication with the user terminal 3 is restored in operation 2340, the cooking apparatus 1 according to an embodiment may resume the cooking operation based on the cooking status information in operation 2350.

In other words, the cooking apparatus 1 may resume the cooking operation based on the cooking status information stored when the cooking operation is stopped, when connection of the communication with the user terminal 3 is restored after the cooking operation is stopped due to the disconnection of communication with the user terminal 3, thereby guaranteeing cooking continuity.

In other words, to resume the stopped cooking operation based on the cooking status information stored when the cooking operation is stopped when connection of the communication with the user terminal 3 is restored, the cooking apparatus 1 may control the cooking module 150 to perform the cooking operation in the cooking mode at the set temperature for the remaining cooking time.

Figure 24:
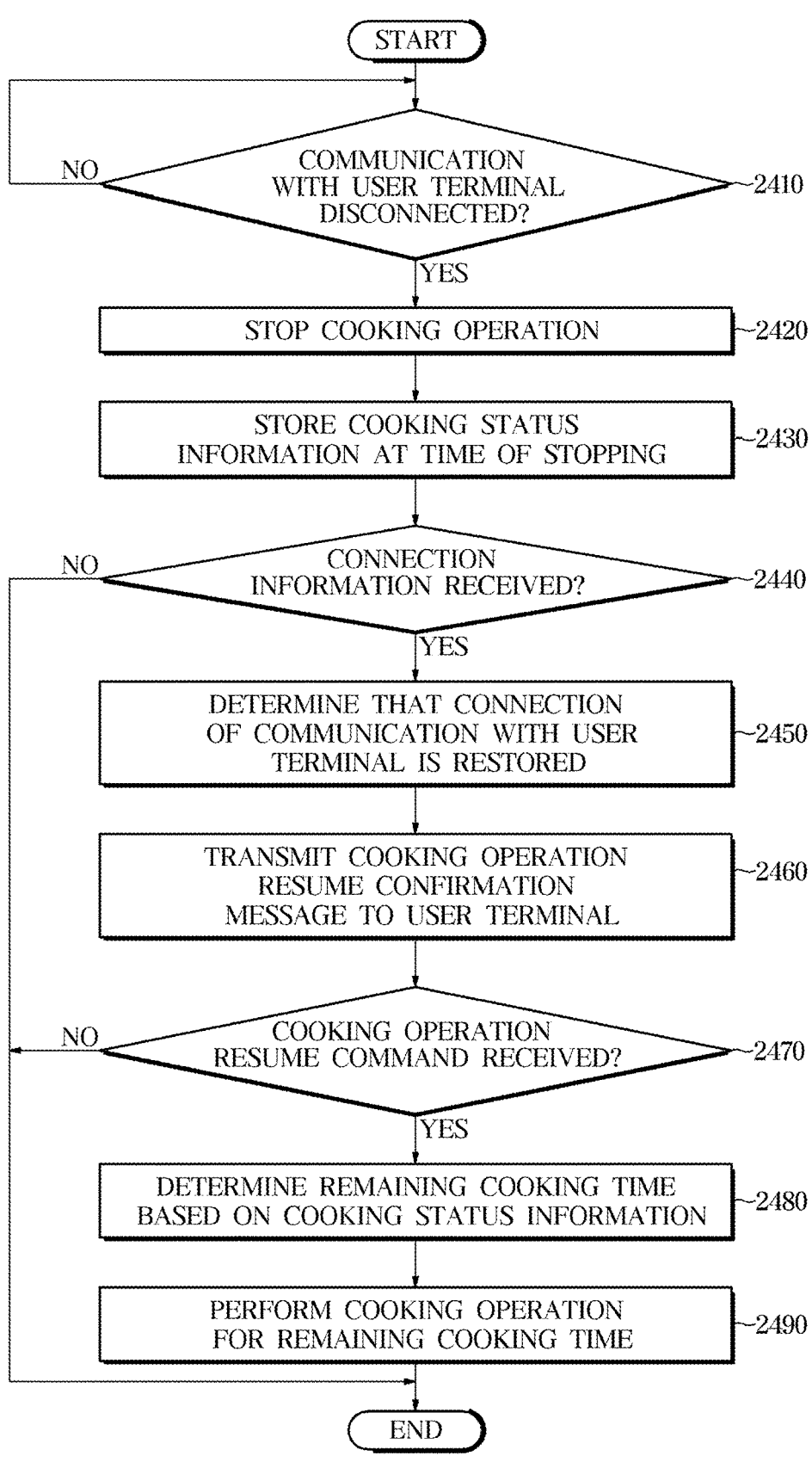
FIG. 24 is a flowchart of a case of resuming a cooking operation based on a resume command in a method of controlling a cooking apparatus, according to an embodiment of the disclosure.

FIG. 24 is a flowchart of a case of resuming a cooking operation based on a resume command in a method of controlling a cooking apparatus according to an embodiment of the disclosure.

Referring to FIG. 24, when communication with the user terminal 3 is disconnected in operation 2410, the cooking apparatus 1 according to an embodiment may stop the cooking operation in operation 2420 and store cooking status information at the time of the stopping in operation 2430.

When receiving connection information from the user terminal 3 in operation 2440, the cooking apparatus 1 may determine that connection of communication with the user terminal 3 is restored in operation 2450.

In this case, the cooking apparatus 1 may transmit a cooking operation resume confirmation message to the user terminal 3 in operation 2460, determine a remaining cooking time based on the cooking status information in operation 2480 when the cooking operation resume command is received in operation 2470, and perform the cooking operation for the remaining cooking time in operation 2490.

In this case, the cooking apparatus 1 may determine a difference between the temperature set for cooking of the cooking module 150 and a current temperature of the cooking module 150 based on the cooking status information, and control the determined remaining cooking time to increase to be proportional to the determined difference in temperature.

Specifically, when the current temperature of the cooking module 150 is lower than the temperature set for cooking in the cooking status information, the remaining cooking time in the cooking status information may be controlled to increase to compensate for the dropped temperature of the cooking module 150. For example, the temperature of the cooking chamber 151 dropped from the deactivation may be compensated by adding 3 minutes to the remaining cooking time when the current temperature is more than 10 degrees lower than the set temperature.

Meanwhile, the embodiments of the disclosure may be implemented in the form of a recording medium for storing instructions to be carried out by a computer. The instructions may be stored in the form of program codes, and when executed by a processor, may generate program modules to perform operations in the embodiments of the disclosure. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device, or the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A cooking apparatus comprising:
   a cooking module configured to perform a cooking operation by heating an object to be heated;
   a communication module configured to communicate with a user terminal;
   a memory; and
   at least one processor configured to:
      control the cooking module to perform the cooking operation based on a control command received from the user terminal,
      control the cooking module to stop the cooking operation in response to disconnection of communication with the user terminal,
      determine cooking status information at a time when the communication with the user terminal is disconnected, and
      store the cooking status information in the memory.

2. The cooking apparatus of claim 1, wherein the at least one processor is further configured to:
   control the communication module to transmit cooking status information to the user terminal, and
   determine the communication with the user terminal as being disconnected in response to a failure of receiving acknowledgment (ACK) from the user terminal.

3. The cooking apparatus of claim 2, wherein the at least one processor is further configured to control the communication module to retransmit the cooking status information a preset number of times in response to the failure of receiving the ACK from the user terminal.

4. The cooking apparatus of claim 3, wherein the at least one processor is further configured to determine the communication with the user terminal as being disconnected in response to a failure of receiving the ACK after the retransmission of the cooking status information.

5. The cooking apparatus of claim 1, wherein the at least one processor is further configured to determine the communication with the user terminal as being disconnected in response to a failure of receiving a communication signal for a preset period of time from an access point (AP) which relays communication with the user terminal.

6. The cooking apparatus of claim 1, wherein the at least one processor is further configured to determine the communication with the user terminal as being disconnected in response to reception of information about disconnection of the communication with the user terminal from an external server.

7. The cooking apparatus of claim 1, wherein the at least one processor is further configured to send an off signal to the cooking module to stop the cooking operation in response to disconnection of the communication with the user terminal.

8. The cooking apparatus of claim 1, further comprising:
   a valve configured to open or close a gas supply tube connected to the cooking module,
   wherein the at least one processor is further configured to control the valve to close the gas supply tube to stop the cooking operation in response to disconnection of the communication with the user terminal.

9. The cooking apparatus of claim 1, wherein the at least one processor is further configured to control the cooking module to stop the cooking operation after elapse of a preset period of time depending on a cooking progress stage in response to disconnection of the communication with the user terminal.

10. The cooking apparatus of claim 9, wherein the at least one processor is further configured to:
   determine an ongoing time section among a plurality of time sections of a whole cooking time in response to disconnection of the communication with the user terminal; and
   control the cooking module to stop the cooking operation after elapse of the preset period of time corresponding to the determined time section.

11. The cooking apparatus of claim 10, wherein the at least one processor is further configured to control the communication module to try communication with the user terminal a preset number of times before controlling the cooking module to stop the cooking operation after elapse of the preset period of time.

12. The cooking apparatus of claim 1, wherein the at least one processor is further configured to:
   control the cooking module to resume the cooking operation based on the cooking status information in response to restoration of connection of communication with the user terminal.

13. The cooking apparatus of claim 12, wherein the at least one processor is further configured to:
   control the communication module to transmit, to the user terminal, a message confirming whether to resume the cooking operation in response to restoration of connection of the communication with the user terminal, and
   control the cooking module to resume the cooking operation in response to reception of a command to resume the cooking operation from the user terminal.

14. The cooking apparatus of claim 12, wherein the at least one processor is further configured to:

determine a remaining cooking time of a set cooking time based on the cooking status information in response to restoration of connection of the communication with the user terminal, and control the cooking module to perform the cooking operation for the remaining cooking time.

15. A method of controlling a cooking apparatus including a cooking module for performing a cooking operation by heating an object to be cooked and a communication module for communicating with a user terminal, the method comprising:

controlling the cooking module to perform the cooking operation based on a control command received from the user terminal;

controlling the cooking module to stop the cooking operation in response to disconnection of communication with the user terminal;

determining cooking status information at a time when the communication with the user terminal is disconnected; and storing the cooking status information in memory.

16. The method of claim 15, wherein the cooking status information includes at least one of: information about a cooking mode, a temperature set for cooking, a time set for cooking, a cooking start time, a cooking progress time, a remaining cooking time, or a temperature in the cooking module.

\* \* \* \* \*